(12) United States Patent
Sadahira et al.

(10) Patent No.: US 9,078,295 B2
(45) Date of Patent: Jul. 7, 2015

(54) HEATING/COOKING EQUIPMENT

(75) Inventors: Masafumi Sadahira, Shiga (JP); Tomoya Fujinami, Shiga (JP); Naoaki Ishimaru, Shiga (JP); Izuo Hirota, Hyogo (JP); Takahiro Miyauchi, Hyogo (JP); Fumitaka Ogasawara, Hyogo (JP)

(73) Assignee: Panasonic Corporation, Osaka (JP)

( * ) Notice: Subject to any disclaimer, the term of this patent is extended or adjusted under 35 U.S.C. 154(b) by 583 days.

(21) Appl. No.: 13/145,686

(22) PCT Filed: Jan. 21, 2010

(86) PCT No.: PCT/JP2010/000321
§ 371 (c)(1),
(2), (4) Date: Jul. 21, 2011

(87) PCT Pub. No.: WO2010/084752
PCT Pub. Date: Jul. 29, 2010

(65) Prior Publication Data
US 2011/0278285 A1 Nov. 17, 2011

(30) Foreign Application Priority Data

Jan. 23, 2009 (JP) .............................. 2009-012630
Jul. 28, 2009 (JP) .............................. 2009-174950
Oct. 23, 2009 (JP) .............................. 2009-244009

(51) Int. Cl.
*H05B 6/54* (2006.01)
*H05B 6/12* (2006.01)

(52) U.S. Cl.
CPC .................................. *H05B 6/1209* (2013.01)

(58) Field of Classification Search
CPC ... F24C 15/105; F24C 15/106; H05B 1/0266; H05B 3/746; H05B 3/748; H05B 6/06; H05B 6/062; H05B 6/065; H05B 6/08; H05B 2213/04; H05B 2213/05; H05B 2213/06; H05B 2213/07; Y02B 40/126
USPC ......... 219/446.1–448.13, 620, 624, 626, 650, 219/665
See application file for complete search history.

(56) References Cited

U.S. PATENT DOCUMENTS 4,446,350 A    5/1984  Mizukawa et al.
5,945,017 A *  8/1999  Cheng et al. ............... 219/446.1

(Continued)

FOREIGN PATENT DOCUMENTS

CN    1701639 A    11/2005
EP    2 378 836 A1  10/2011

(Continued)

OTHER PUBLICATIONS

JP 61-243690 A English Translation.*

(Continued)

*Primary Examiner* — Dana Ross
*Assistant Examiner* — Brandon Harvey
(74) *Attorney, Agent, or Firm* — Brinks Gilson & Lione

(57) ABSTRACT

There is provided a heating/cooking equipment capable of accurately determining boiling over. The heating/cooking equipment includes: a top plate (104) connected to a reference potential; a heating unit (105) configured to heat an object to be heated placed on the top plate; an electrode (106) arranged under the top plate; a capacitance detecting unit (107) configured to detect the electrostatic capacitance of the electrode; a boiling over detecting unit (108) configured to detect whether or not a material to be cooked in the object to be heated has boiled over on the top plate, based on a value of the electrostatic capacitance detected by the capacitance detecting unit; and a control unit (109) configured to control the heating operation of the heating unit based on a boiling over detection result from the boiling over detecting unit. The capacitance detecting unit (107) detects a change in the electrostatic capacitance of the electrode by exploiting capacitive coupling between the electrode and the reference potential which is enhanced by increase in a boiled over amount of the material to be cooked with moisture contained in the material to be cooked functioning as a dielectric when the material to be cooked boils over on the top plate.

21 Claims, 21 Drawing Sheets

(56) References Cited

U.S. PATENT DOCUMENTS

| | | | |
|---|---|---|---|
| 6,498,325 B1 * | 12/2002 | Akel et al. | 219/624 |
| 2006/0081607 A1 | 4/2006 | Niiyama et al. | |
| 2008/0173632 A1 * | 7/2008 | Jang et al. | 219/432 |
| 2008/0237215 A1 * | 10/2008 | Lee et al. | 219/447.1 |

FOREIGN PATENT DOCUMENTS

| | | | | |
|---|---|---|---|---|
| JP | 57-009093 A | | 1/1982 | |
| JP | 61-243690 A | * | 10/1986 | |
| JP | 2003-224459 A | | 8/2003 | |
| JP | 2005-166392 A | | 6/2005 | |
| JP | 2005257202 A | * | 9/2005 | F24C 3/12 |
| JP | 2008-159494 A | | 7/2008 | |
| JP | 2008159494 A | * | 7/2008 | |
| WO | WO 2010/079583 A1 | | 7/2010 | |

OTHER PUBLICATIONS

Extended European Search Report for European Application No. 10733360.1, dated Oct. 1, 2013, 7 pages.

International Search Report for International Application No. PCT/JP2010/000321, dated Apr. 27, 2010, 2 pages.

International Preliminary Report on Patentability for counterpart International Application No. PCT/JP2010/000321, dated Aug. 9, 2011, 10 pages.

European Examination Report, dated Oct. 29, 2014, pp. 1-6, issued in European Patent Application No. 10733360.1, European Patent Office, Munich, Germany.

European Examination Report, dated Jun. 5, 2014, pp. 1-7, issued in European Patent Application No. 10733360.1, European Patent Office, Munich, Germany.

* cited by examiner

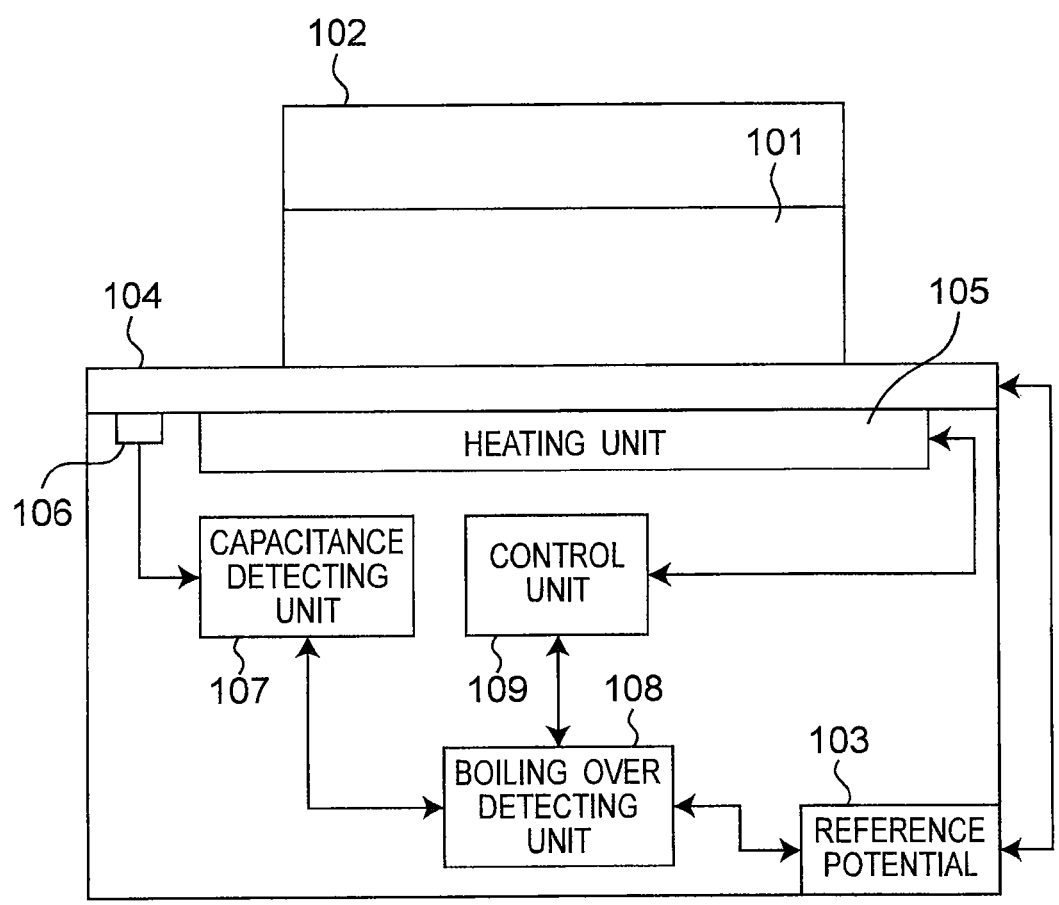

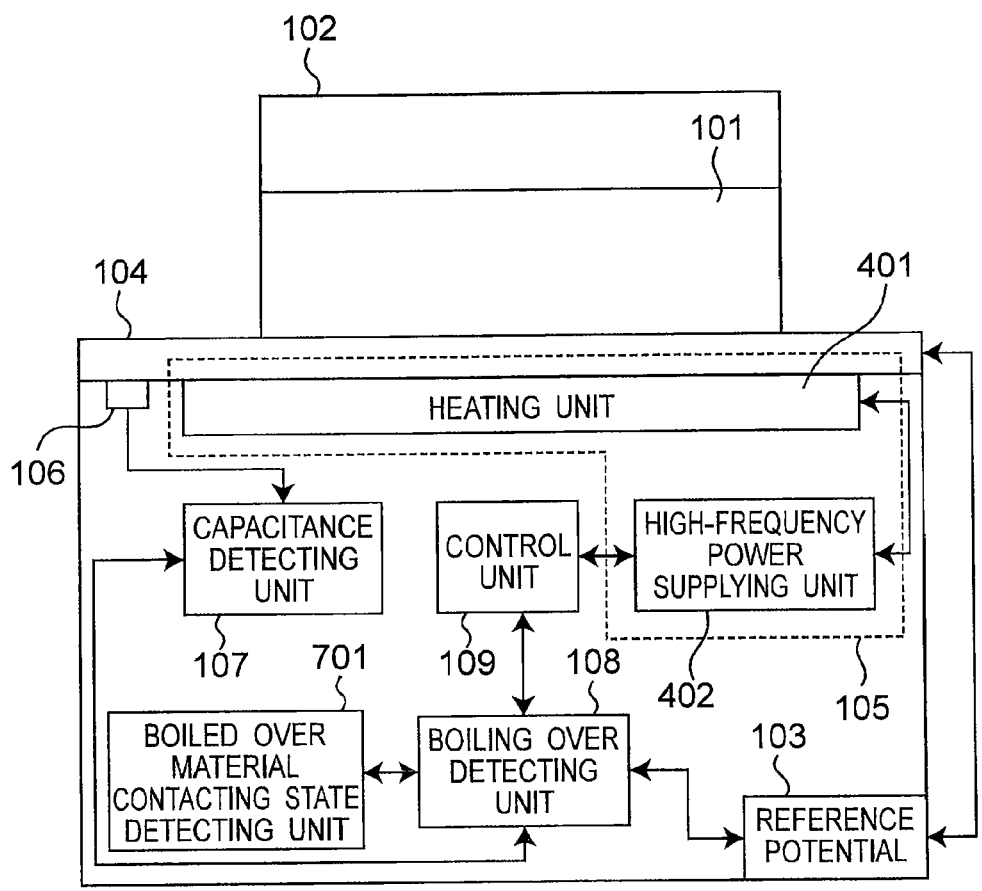

CASE IN WHICH BOILED OVER MATERIAL IS IN CONTACT WITH OBJECT TO BE HEATED AND EFFECT OF ELECTRIC FIELD OCCURS

CASE IN WHICH BOILED OVER MATERIAL IS NOT IN CONTACT WITH OBJECT TO BE HEATED AND EFFECT OF ELECTRIC FIELD DOES NOT OCCUR

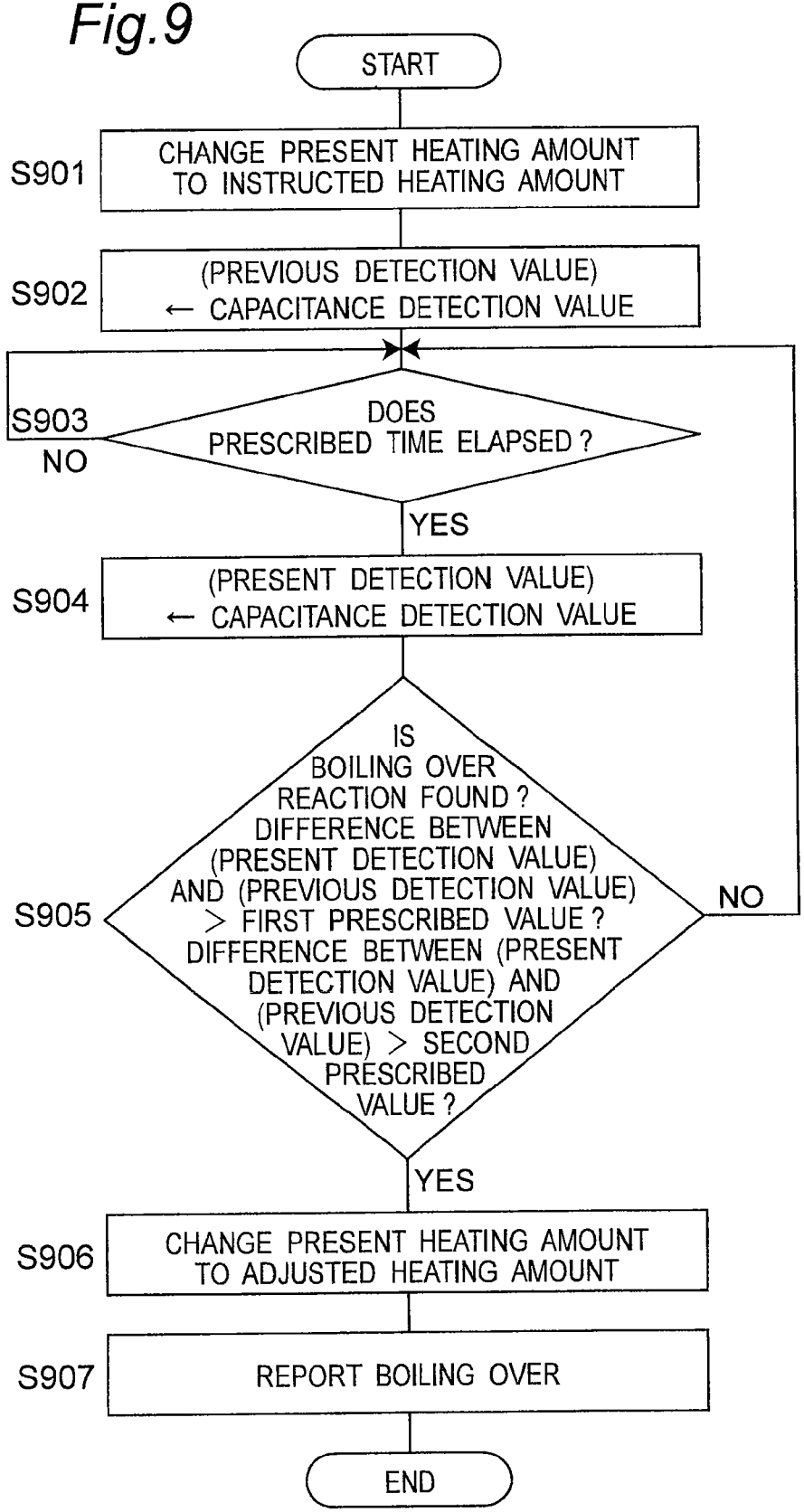

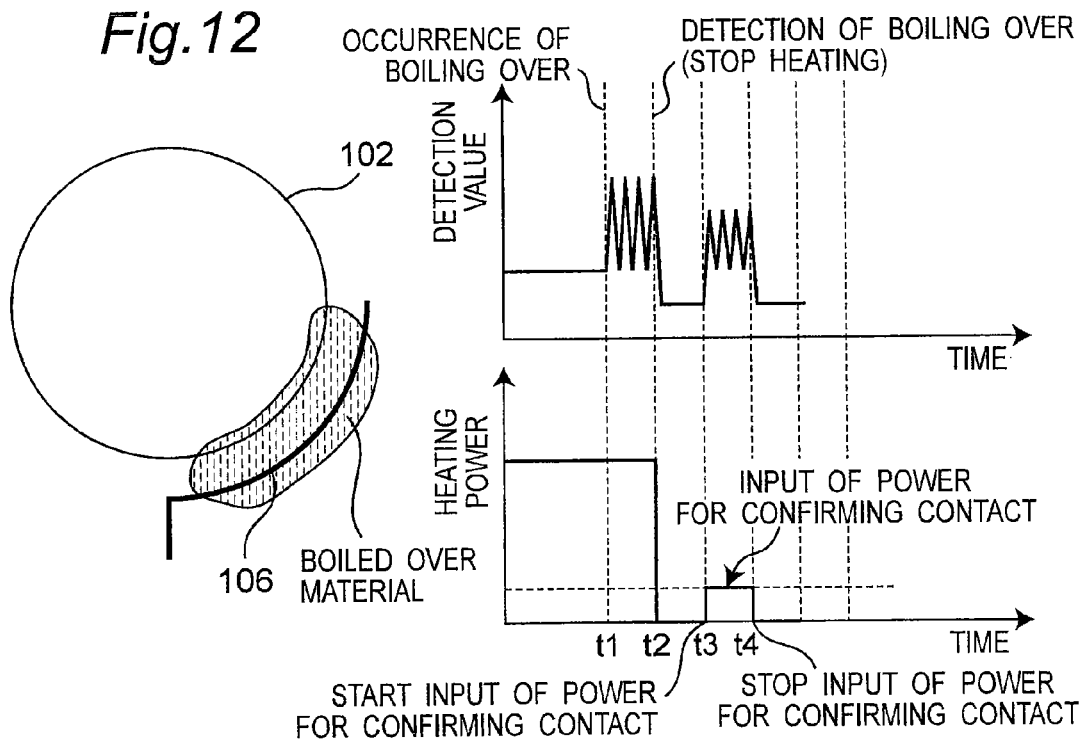
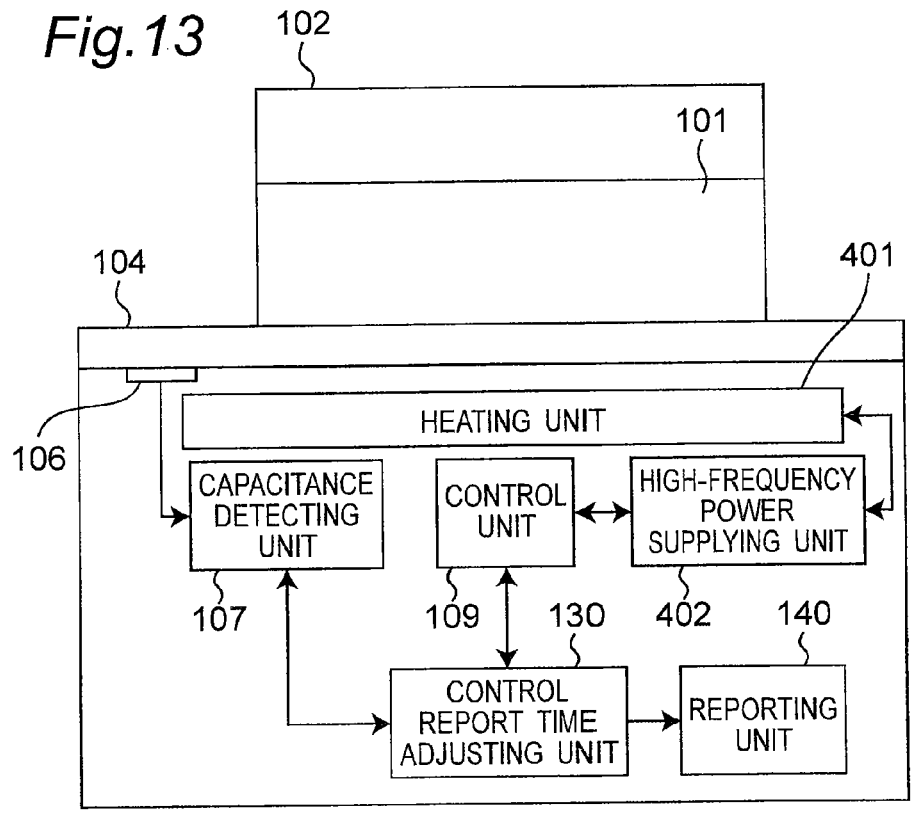

CHANGE OF CAPACITANCE DETECTION VALUE
WHEN NO HEATING-TARGET OBJECT IS PRESENT ON ELECTRODE

CHANGE OF CAPACITANCE DETECTION VALUE
WHEN HEATING-TARGET OBJECT IS PRESENT ON ELECTRODE

HEATING/COOKING EQUIPMENT

TECHNICAL FIELD

The present invention relates to a heating/cooking equipment that heats a material to be cooked. In particular, the present invention relates to a heating/cooking equipment that detects a material to be cooked being boiling over.

BACKGROUND ART

Conventional heating/cooking equipment detects boiling over by sensing a change in an electrostatic capacitance caused by ingredients or the like boiled over from a cooking vessel to thereby cover an electrode disposed on the lower surface of a top plate (for example, see Patent Document 1).

Patent Document 1: JP 2008-159494 A

SUMMARY OF INVENTION

Technical Problem

However, as in the conventional manner, when detection of boiling over on the top plate is carried out based on an observation of any change in the electrostatic capacitance, in some cases, a change in the electrostatic capacitance by an electric circuit cannot correctly be observed. Therefore, there are some cases where a determination as to boiling over cannot accurately be made.

The present invention is to solve the conventional problem stated above, and an object of the present invention is to provide heating/cooking equipment which can accurately determine boiling over.

Solution to Problem

In order to solve the conventional problem, a heating/cooking equipment of the present invention includes: a top plate connected to a reference potential; a heating unit configured to heat an object to be heated placed on the top plate; at least one electrode arranged under the top plate; a capacitance detecting unit configured to detect an electrostatic capacitance of the electrode; a boiling over detecting unit configured to detect whether or not a material to be cooked in the object to be heated has boiled over on the top plate, based on a value of the electrostatic capacitance of the electrode detected by the capacitance detecting unit; and a control unit configured to control a heating operation of the heating unit based on a detection result of boiling over by the boiling over detecting unit, wherein the capacitance detecting unit detects a change in the electrostatic capacitance of the electrode by exploiting capacitive coupling between the electrode and the reference potential which is enhanced by increase in a boiled over amount of the material to be cooked with moisture contained in the material to be cooked functioning as a dielectric when the material to be cooked boils over on the top plate connected to the reference potential. Thus, a certain amount of the material to be cooked spreading along the object to be heated such as a pot or pan establishes capacitive coupling between the top plate connected to the reference potential and the electrode, whereby a change in the electrostatic capacitance of the boiled over material in a practically valid amount can be observed. Hence, a determination as to practically valid boiling over can be made.

The heating/cooking equipment may further include a metal member provided under the top plate and near the electrode. Thus, it becomes possible to enhance a change in the electrostatic capacitance caused by boiling over.

The heating unit may include: a heating coil configured to inductively heat the object to be heated as being supplied with high-frequency power; and a high-frequency power supplying unit configured to supply the high-frequency power to the heating coil. Thus, it becomes possible to implement the induction heating/cooking equipment possessing the boiling over detecting function.

The metal member may be a copper winding wire used for the heating coil. Thus, it becomes possible to improve the boiling over detection performance at low cost, without newly adding a structure for improving the detection performance.

The shape of the electrode may be an arc-shape that is positioned substantially concentrically on the heating coil. Thus, it becomes possible to improve the capacitive coupling between the heating coil and the electrode.

The heating/cooking equipment may further include a filter configured to remove an induction heating frequency component superimposed on the change of the electrostatic capacitance of the electrode detected by the capacitance detecting unit. Thus, it becomes possible to carry out a stable boiling over detection.

The boiling over detecting unit may make a determination as to boiling over, by observing an induction heating frequency component generated due to an effect of induction heating by capacitive coupling between the electrode and the heating coil. Thus, a determination as to boiling over can be made even when the detection value of the electrostatic capacitance increases by induction heating. Further, it becomes also possible to discern whether the change in the electrostatic capacitance is due to an object being placed on the electrode, or due to an occurrence of boiling over.

The electrode may be printed on the top plate. This improves adhesion between the electrode and the top plate, whereby the boiling over detection performance can be improved.

The capacitance detecting unit may observe a change in an impedance due to an increase in the electrostatic capacitance of the electrode by using a voltage dividing circuit. Thus, it becomes possible to detect a change in the electrostatic capacitance with a cost effective structure.

The heating/cooking equipment may further include: a boiled over material contacting state detecting unit configured to sense an increase in the electrostatic capacitance of the electrode due to capacitive coupling between the electrode and the object to be heated via a boiled over material physically in contact with the object to be heated, to recognize an electric field change of induction heating-origin directly transferred from the object to be heated, and the boiling over detecting unit may detect boiling over of the material to be cooked, based on a detection result of the capacitance detecting unit and a detection result of the boiled over material contacting state detecting unit. Thus, it becomes possible to accurately make a determination as to boiling over, even when the boiled over material is small in amount and is in contact with the object to be heated, and whereby the change in the electrostatic capacitance due to the effect of an electric field generated by induction heating of the object to be heated is greater than the change in the electrostatic capacitance due to the connection with the reference potential.

The heating/cooking equipment may further include a boiled over material contacting state confirming unit configured to execute, through the control unit, heating control for confirming whether or not the increase in the electrostatic capacitance of the electrode sensed by the boiled over material contacting state detecting unit is due to the capacitive coupling between the electrode and the object to be heated via the material to be cooked having boiled over. Thus, it becomes possible to confirm that boiling over is actually occurring.

The heating control may be, upon sensing the increase in the electrostatic capacitance of the electrode by the boiled over material contacting state detecting unit, to stop a heating operation performed by the heating coil for a prescribed time, and after a lapse of the prescribed time, to operate the heating coil with smaller heating power as compared to heating power before the stop of the heating operation. Thus, it becomes possible to prevent a change in the state of the boiled over material as being vaporized due to the effect of the confirming-purpose heating power.

The heating/cooking equipment may further include a reporting unit configured to report an occurrence of boiling over to a user, wherein the boiling over detecting unit is a control report time adjusting unit configured to execute, upon a determination of the occurrence of boiling over, a boiling over detecting process that includes an operation of controlling a heating amount of the heating coil through the control unit and an operation of adjusting a time until the reporting unit reports the occurrence of boiling over to the user. For example, upon occurrence of a change in the electrostatic capacitance, the following is executed as the boiling over detecting process: to once execute heating amount control (for example, stop heating) for preventing the boiled over material from spreading; thereafter, to fix whether or not the change in the electrostatic capacitance is due to boiling over; and then make a report to the user about the boiling over or to continue heating with the original heating amount. Thus, it becomes possible to execute the boiling over detecting process by distinguishing between a case where ingredients, eating utensils, cooking utensils are shifted or wipe-cleaning with a kitchen cloth is performed on the top plate which is also used as a countertop, and a case where boiling over is occurring. That is, whether or not boiling over has occurred can accurately be determined.

The control report time adjusting unit may be configured to compare a detection value of the capacitance detecting unit with a prescribed threshold value, to detect boiling over of the material to be cooked. The heating/cooking equipment may further includes a threshold value determining unit configured to determine the prescribed threshold value based on a value of the electrostatic capacitance of the electrode at the start of heating. For example, in a case where the electrostatic capacitance of the electrode at the start of heating is changed by an amount equal to or more than a prescribed amount as compared to a case where no heating-target object is placed on the electrode, it is considered that an object to be heated such as a pot or pan is placed on the electrode. In this case, the threshold value determining unit sets a threshold value, which serves as a reference for determining a change in the electrostatic capacitance for the purpose of detecting boiling over, to a smaller value than a value in a case where no heating-target object is on the electrode. Thus, irrespective of an object to be heated placement situation, the boiling over detection sensitivity can be secured.

In the heating/cooking equipment, a plurality of the electrodes may be included, and the control report time adjusting unit may execute the boiling over detecting process based on a value of the electrostatic capacitance of each of a plurality of the electrodes. Thus, it becomes possible to determine the manner of boiling over based on the object to be heated placement situation, the object to be heated size, and a changing order among a plurality of electrodes, to thereby perform heating control in accordance with a boiled over amount of the material to be cooked.

When the electrostatic capacitance of each of a plurality of the electrodes changes at the start of heating, the control report time adjusting unit may simultaneously control the heating unit to stop heating and control the reporting unit to make a report. Thus, even in a case where a large pot enough to cover all of a plurality of electrodes is heated, and where it takes time for the material to be cooked boiled over from the pot to reach the point over the electrode while passing through the gap between the pot and the top plate, it becomes possible to prevent the material to be cooked from burning to the top plate by stopping heating and making a report.

When the electrostatic capacitance of at least one of a plurality of the electrodes changes at the start of heating, the control report time adjusting unit may simultaneously control the heating unit to stop heating and control the reporting unit to make a report. Thus, for example, even in a case where the material to be cooked is boiled over on a portion where the pot is on the electrode, it becomes possible to prevent the material to be cooked from burning to the top plate by stopping heating and making a report.

In the heating/cooking equipment, a plurality of the heating coils may be included, and the control report time adjusting unit may control the heating amount of all of the heating coils when boiling over of the material to be cooked is detected. For example, when boiling over has occurred, since it cannot tell in which direction the boiled over material flows over the top plate, heating of all the heating coils may be stopped. Thus, in whichever direction the boiled over material flows over the top plate, it becomes possible to prevent the boiled over material to be cooked from burning to the top plate.

The heating/cooking equipment may further include a human body detecting unit configured to detect whether or not a person is present, wherein the control report time adjusting unit may execute the boiling over detecting process based on a detection result of the human body detecting unit. For example, when the user is not present nearby, the heating operation is stopped. On the other hand, when the user is present nearby, since the determination as to boiling over can be deferred to the user, the heating operation is not stopped, but instead, the control of the heating amount is continued or the heating amount is reduced by a prescribed amount.

The heating/cooking equipment may further include an object to be heated shift detecting unit configured to detect whether or not the object to be heated is shifted, wherein the control report time adjusting unit may prohibit execution of the boiling over detecting process, when the object to be heated shift detecting unit detects shift of the object to be heated. Thus, it becomes possible to prevent an erroneous determination that boiling over has occurred from being made upon occurrence of a change in the electrostatic capacitance due to shift of the object to be heated such as a pot.

The heating/cooking equipment may further include a temperature detecting unit configured to detect a temperature of the object to be heated, and the control report time adjusting unit may prohibit execution of the boiling over detecting process, when the temperature of the object to be heated detected by the temperature detecting unit is lower than a boiling point of water. Thus, it becomes possible to determine, as a disturbance, a change in the electrostatic capacitance that occurred when there is no possibility of boiling over, and to prevent an erroneous determination that boiling over has occurred from being made.

Advantageous Effects of Invention

According to the present invention, since the top plate is connected to the reference potential, the connection between the electrode and the reference potential by capacitive coupling is further enhanced in accordance with an amount of the material to be cooked being boiled over on the top plate. Accordingly, a change in the electrostatic capacitance of the electrode can correctly be observed. Hence, detection of boiling over can accurately be performed, and a highly practical boiling over detecting function can be realized.

BRIEF DESCRIPTION OF THE DRAWINGS

FIG. 1 is a block diagram of heating/cooking equipment according to a first embodiment of the present invention.

FIG. 7 is a block diagram showing still another structure of the heating/cooking equipment according to the first embodiment of the present invention.

FIG. 9 is a flowchart showing a boiling over detection operation of the heating/cooking equipment shown in FIG. 7.

FIG. 12 is a diagram showing a confirming operation of a boiled over material contacting state of the heating/cooking equipment shown in FIG. 10.

FIG. 13 is a block diagram showing the structure of heating/cooking equipment according to a second embodiment of the present invention.

DETAILED DESCRIPTION OF THE PREFERRED EMBODIMENTS

Figure 2A:
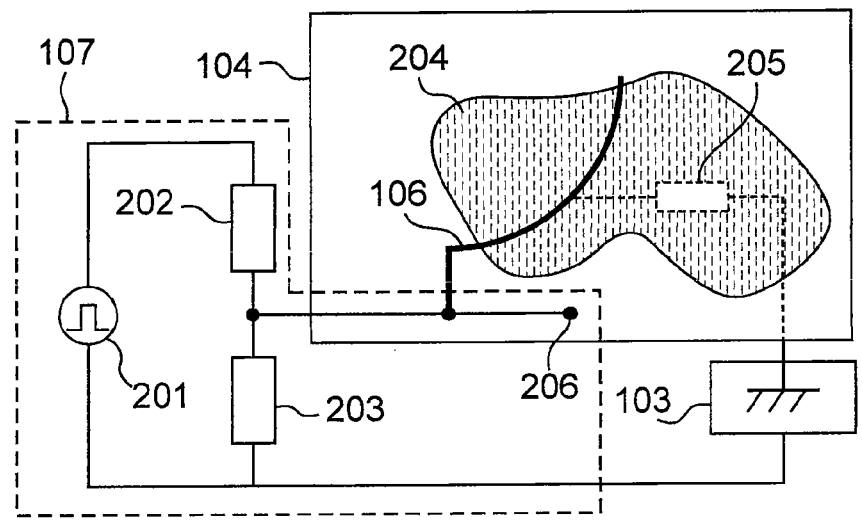
FIG. 2A is a conceptual diagram of a capacitance detecting unit.

In the following, with reference to the drawings, a description will be given of embodiments of the present invention. It is to be noted that the present invention is not limited by the following embodiments.

First Embodiment

Heating/cooking equipment according to a first embodiment of the present invention exploits a phenomenon in which, with a top plate connected to the reference potential, an increase in an amount of a boiled over material to be cooked further enhances the connection between an electrode and the reference potential by capacitive coupling. This makes it possible to correctly observe a change in the electrostatic capacitance and, therefore, a determination as to boiling over can accurately be made.

1.1 Structure of Heating/Cooking Equipment

FIG. 1 shows the structure of the heating/cooking equipment according to the first embodiment of the present invention. The heating/cooking equipment according to the present embodiment includes: a top plate 104 on which an object to be heated 102 is placed; a heating unit 105 that heats the object to be heated 102; an electrode 106 that is arranged on the lower surface of the top plate 104; a capacitance detecting unit 107 that detects the electrostatic capacitance of the electrode 106; a boiling over detecting unit 108 that detects occurrence of boiling over based on the detection result of the capacitance detecting unit 107; and a control unit 109 that controls the heating operation of the heating unit 105. In the present embodiment, the top plate 104 is connected to the reference potential 103.

The heating/cooking equipment according to the present embodiment can easily be implemented by: using a circuit ground common to the control unit 109 as the reference potential 103; using crystallized glass as the top plate 104; using an electric heater as the heating unit 105; using a conductor that is formed on the lower surface of the top plate 104 by application or adhesive bonding as the electrode 106; using a circuit (see FIG. 2) that converts the electrostatic capacitance of the electrode 106 into a voltage as the capacitance detecting unit 107; and using a microcomputer as each of the boiling over detecting unit 108 and the control unit 109. The object to be heated 102 is, for example, a pot.

FIG. 2A schematically shows the structure of the capacitance detecting unit 107. The capacitance detecting unit 107 includes: a high-frequency power supply 201 for detecting an electrostatic capacitance; an impedance component 202 and an impedance component 203 connected in series; and a detection voltage terminal 206 for detecting an electrostatic capacitance. FIG. 2A shows an exemplary situation in which a material to be cooked 101 in the object to be heated 102 shown in FIG. 1 has boiled over, and a resultant boiled over material 204 is present on the top plate 104. When the boiled over material 204 is present on the electrode 106, the boiled over material 204, the electrode 106, and the top plate 104 connected to the reference potential 103 establish an impedance component 205 having an electrostatic capacitance between the reference potential 103 and the electrode 106. In this manner, by the reference potential 103 connected to the top plate 104, the potential of the detection voltage terminal 206 is fixed. At this time, the boiled over material 204 functions as a dielectric.

Figure 2B:
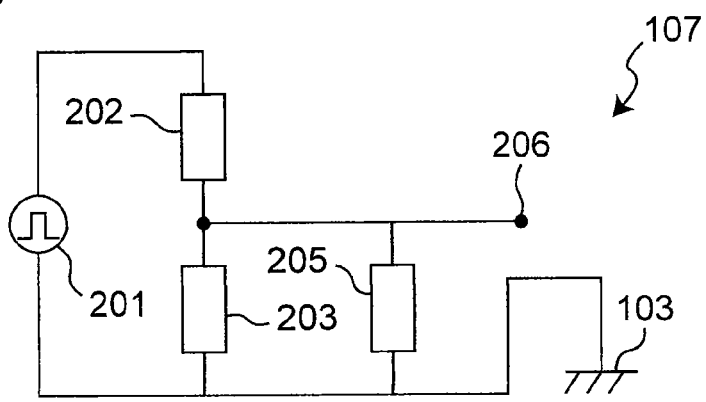
FIG. 2B is an equivalent circuit diagram of a capacitance detecting unit.

FIG. 2B is an equivalent circuit diagram of the capacitance detecting unit 107. In FIG. 2B, the impedance component 202, the impedance component 203, and the impedance component 205 divide a high-frequency voltage (for example, 300 kHz) supplied by the high-frequency power supply 201 for the detection, to fix the voltage of the detection voltage terminal 206. When the boiled over material 204 appears to increase the electrostatic capacitance of the impedance component 205, the voltage generated at the detection voltage terminal 206 changes depending on the voltage division ratio. The capacitance detecting unit 107 detects a change in the electrostatic capacitance of the electrode 106, based on the change in the voltage generated at the detection voltage terminal 206.

Figure 2C:
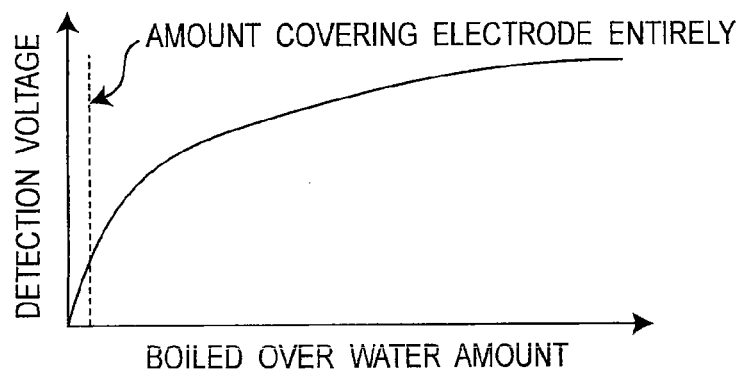
FIG. 2C is a graph of the detection value of the capacitance detecting unit against the boiled over water amount.

FIG. 2C is a graph showing a change amount as to the water amount of the boiled over material 204 and the detection value of the capacitance detecting unit 107. The horizontal axis shown in FIG. 2C indicates the water amount of the boiled over material 204, and the vertical axis indicates the voltage value generated at the detection voltage terminal 206. The change amount of the voltage generated at the detection voltage terminal 206 becomes greater in accordance with the water amount of the boiled over material 204. The voltage still changes after the boiled over material 204 has completely covered the electrode 106, because the voltage changes in accordance with the magnitude of connection with the reference potential 103 through the top plate 104. That is, the voltage generated at the detection voltage terminal 206 changes in accordance with an increase in the electrostatic capacitance due to the impedance component 205.

1.2 Operation of the Heating/Cooking Equipment

Figure 3:
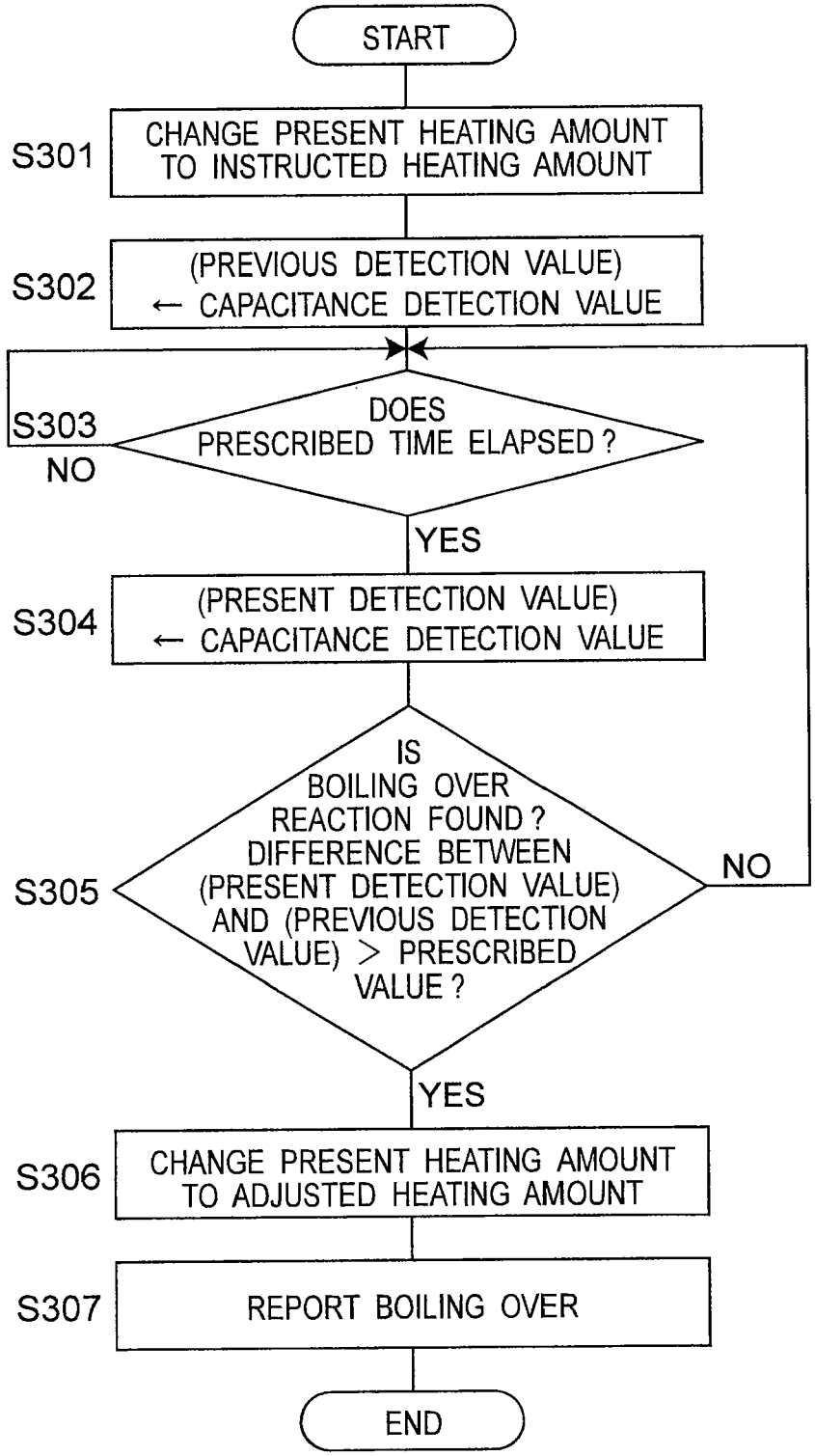
FIG. 3 is a flowchart showing a boiling over detection operation of the heating/cooking equipment according to the first embodiment of the present invention.

The description will be given of the heating/cooking equipment according to the present embodiment. FIG. 3 shows a boiling over detection operation of the heating/cooking equipment according to the present embodiment. When the user puts the material to be cooked 101 in the object to be heated 102 and instructs to start heating, the control unit 109 operates the heating unit 105, to start heating the object to be heated 102 (S301). The boiling over detecting unit 108 acquires a voltage corresponding to the electrostatic capacitance of the electrode 106 output by the capacitance detecting unit 107 as a "capacitance detection value", and substitutes the capacitance detection value at the start of heating into a "previous detection value" which is a variable for detecting boiling over (S302).

Thereafter, the boiling over detecting unit 108 checks whether or not a prescribed time (for example, 0.5 seconds) has elapsed (S303), and executes the boiling over detecting process (S304 to S307). Specifically, the boiling over detecting unit 108 acquires the voltage corresponding to the electrostatic capacitance of the electrode 106 as the "capacitance detection value" by the capacitance detecting unit 107, and substitutes the acquired capacitance detection value into a "present detection value" which is a variable for detecting boiling over (S304).

The boiling over detecting unit 108 determines whether or not the difference between the "previous detection value" and the "present detection value" of the electrostatic capacitance of the electrode 106 is greater than a prescribed value (for example, $1/10$ as great as the maximum voltage change amount) (S305). When the difference is greater than the prescribed value, the boiling over detecting unit 108 determines that boiling over has occurred. When the electrostatic capacitance of the impedance component 205 shown in FIG. 2 increases, the voltage generated at the detection voltage terminal 206 decreases. Therefore, specifically, when the "present detection value" is a value being smaller than the "previous detection value" by a value equal to or more than a prescribed amount, it is determined that the boiling over has occurred. When the boiling over detecting unit 108 determines that the boiling over is not occurring, the boiling over detecting process once ends, and a determination is again made after a lapse of the prescribed time (return to S303). In this manner, whether boiling over has occurred is determined every lapse of the prescribed time. When the boiling over detecting unit 108 determines that boiling over has occurred, the control unit 109 changes the "present heating amount" to the "adjusted heating amount (stop heating, an amount $1/3$ as great as the heating amount or the like)" (S306), then reports the occurrence of boiling over to the user through the reporting unit or the like (S307), and the boiling over detection operation ends.

1.3 Conclusion

According to the present invention, since the top plate 104 is connected to the reference potential, in accordance with the amount of the material to be cooked 101 boiled over on the top plate, the connection by the capacitive coupling between the electrode 106 and the reference potential further enhances. Therefore, a change in the electrostatic capacitance of the electrode 106 can correctly be observed. Hence, a determination as to boiling over can accurately be made, and a highly practical boiling over detecting function can be realized. Specifically, the capacitance detecting unit 107 exploits the phenomenon in which, when the material to be cooked 101 is spilled over the top plate 104 connected to the reference potential and the moisture contained in the material to be cooked 101 functions as a dielectric, an increase in the amount of the boiled over material enhances the connection between the electrode 106 and the reference potential 103 by capacitive coupling. Accordingly, the boiling over detecting unit 108 can correctly recognize a change in the electrostatic capacitance by the detection result of the capacitance detecting unit 107, to thereby detect boiling over. Hence, a highly practical boiling over detecting function can be realized.

It is to be noted that, by using printing means as a way for installing the electrode 106 at the top plate 104, the installation to the glass of a high permittivity can be carried out without intervention of air of a low permittivity. Therefore, it becomes possible to increase the electrostatic capacitance.

It is to be noted that, in the present embodiment, the electric heater is used as the heating unit 105. However, the structure of the heating unit 105 is not limited to the present embodiment. For example, heat source of gas can be used as the heating unit 105.

Further, in the present embodiment, a circuit ground common to the control unit 109 is used as the reference potential 103. However, the reference potential 103 is not limited to the present embodiment. For example, a chassis ground structured with a chassis sheet metal or the like may be used as the reference potential 103, or a potential slightly higher than ground may be used as the reference potential 103.

1.4 Variations

It is to be noted that, the heating/cooking equipment of the present invention is not limited to the first embodiment, and may be structured as follows.

(Variation 1)

Figure 4:
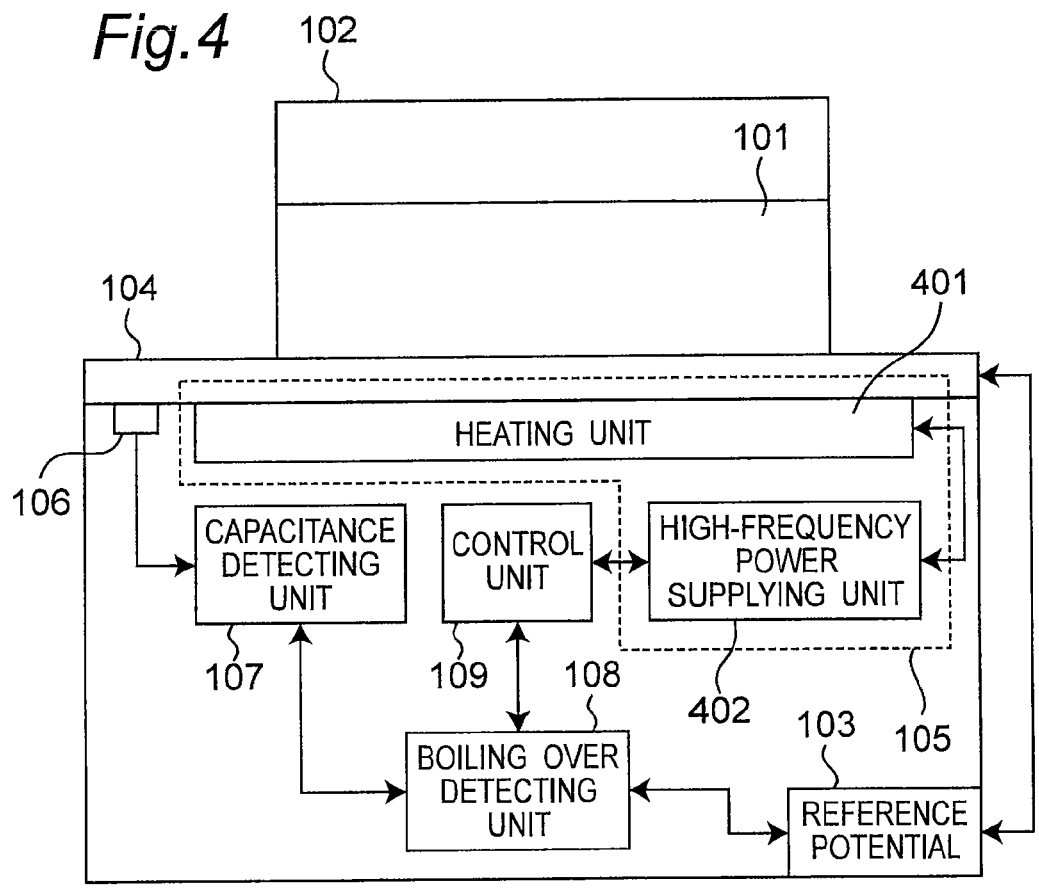
FIG. 4 is a block diagram showing another structure of the heating/cooking equipment according to the first embodiment of the present invention.

Though the heating/cooking equipment shown in FIG. 1 uses the electric heater, the present invention may be practiced as induction heating/cooking equipment using a heating coil. FIG. 4 shows another structure of the heating/cooking equipment according to the present embodiment. In FIG. 4, identical reference characters are allotted to the components identical to those in FIG. 1, and a detailed description thereof will not be repeated. In FIG. 4, the heating unit 105 includes a heating coil 401 that inductively heats the object to be heated 102 by being supplied with high-frequency power, and a high-frequency power supplying unit 402 that supplies the high-frequency power to the heating coil 401. This structure can be implemented by using a copper winding wire as the heating coil 401 and using an inverter as the high-frequency power supplying unit 402.

The copper winding wire of the heating coil 401 functions as the metal member connecting to the electrode 106 by capacitive coupling via the boiled over material of the material to be cooked 101 and serves to enhance the change in electrostatic capacitance.

Figure 5:
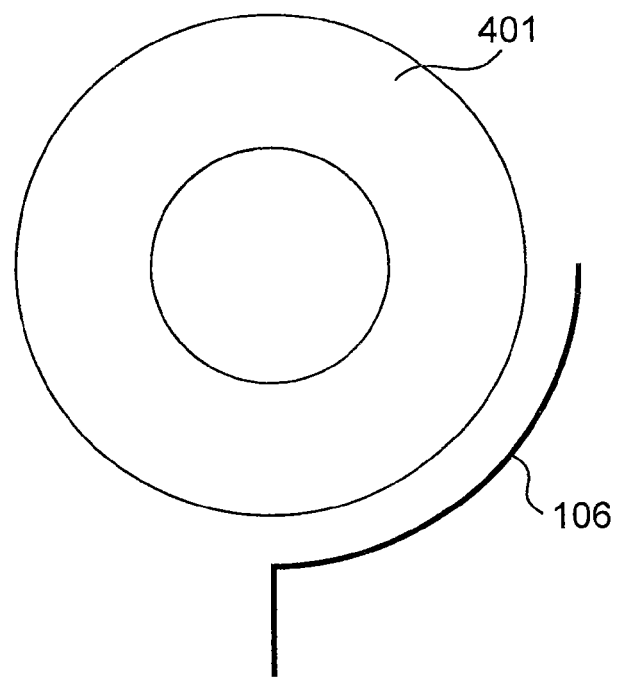
FIG. 5 is a diagram showing a disposition of a metal member and an electrode in the heating/cooking equipment shown in FIG. 4.

FIG. 5 shows disposition of the heating coil 401 and the electrode 106. The electrode 106 is arc-shaped, which is substantially concentric to the heating coil (metal member) 401. This makes it possible to maintain the distance between the electrode 106 and the edge face of the heating coil 401 which is the metal member substantially constant. Therefore, it becomes possible to enhance capacitive coupling between the heating coil 401 of the metal member and the electrode 106.

The basic operation of the induction heating/cooking equipment shown in FIG. 4 is substantially identical to the heating/cooking equipment shown in FIG. 1, and carries out detection of boiling over shown in FIG. 3. It is to be noted that, in the case of the induction heating/cooking equipment shown in FIG. 4, heating by the heating unit 105 is carried out in the following manner: the control unit 109 instructs a target electric power to the high-frequency power supplying unit 402, and the high-frequency power supplying unit 402 supplies the heating coil 401 with high-frequency power in accordance with the target electric power.

In this manner, provision of the heating coil 401 that inductively heats the object to be heated 102, and the high-frequency power supplying unit 402 that supplies the heating coil 401 with the high-frequency power makes it possible to implement the induction heating/cooking equipment possessing the boiling over detecting function.

Provision of the heating coil 401 which is the metal member establishes connection between the electrode 106 and the metal member via the boiled over material. Therefore, it becomes possible to enhance the change of electrostatic capacitance due to boiled over material.

Use of the copper winding wire used for the heating coil 401 as the metal member makes it possible to improve the boiling over detection performance at low cost, without the necessity of newly adding any structure for improving the detection performance.

By setting the shape of the electrode 106 as an arc-shape that makes it possible to maintain the distance to the edge face of the heating coil 401 being the metal member substantially constant, it becomes possible to improve the capacitive coupling between the heating coil 401 as the metal member and the electrode 106.

It is to be noted that, in the case of the induction heating/cooking equipment, the heating coil 401 can be used as the metal member. In a case where the heating unit 105 is gas, a heater or the like, another metal member may be arranged, to enhance the change in the electrostatic capacitance.

By the material to be cooked 101 being boiled over, capacitive coupling between the electrode 106 and the heating coil 401 is established via the boiled over material, and a great change in the electrostatic capacitance occurs. At the same time, on the electrode 106, the components of a high-frequency current passing through the heating coil 401 in induction heating are superimposed as a voltage. Accordingly, the boiling over detecting unit 108 may discern whether the reaction is caused by any object being placed on the electrode 106 or by boiling over, based on an observation of the induction heating frequency components being superimposed.

(Variation 2)

Figure 6:
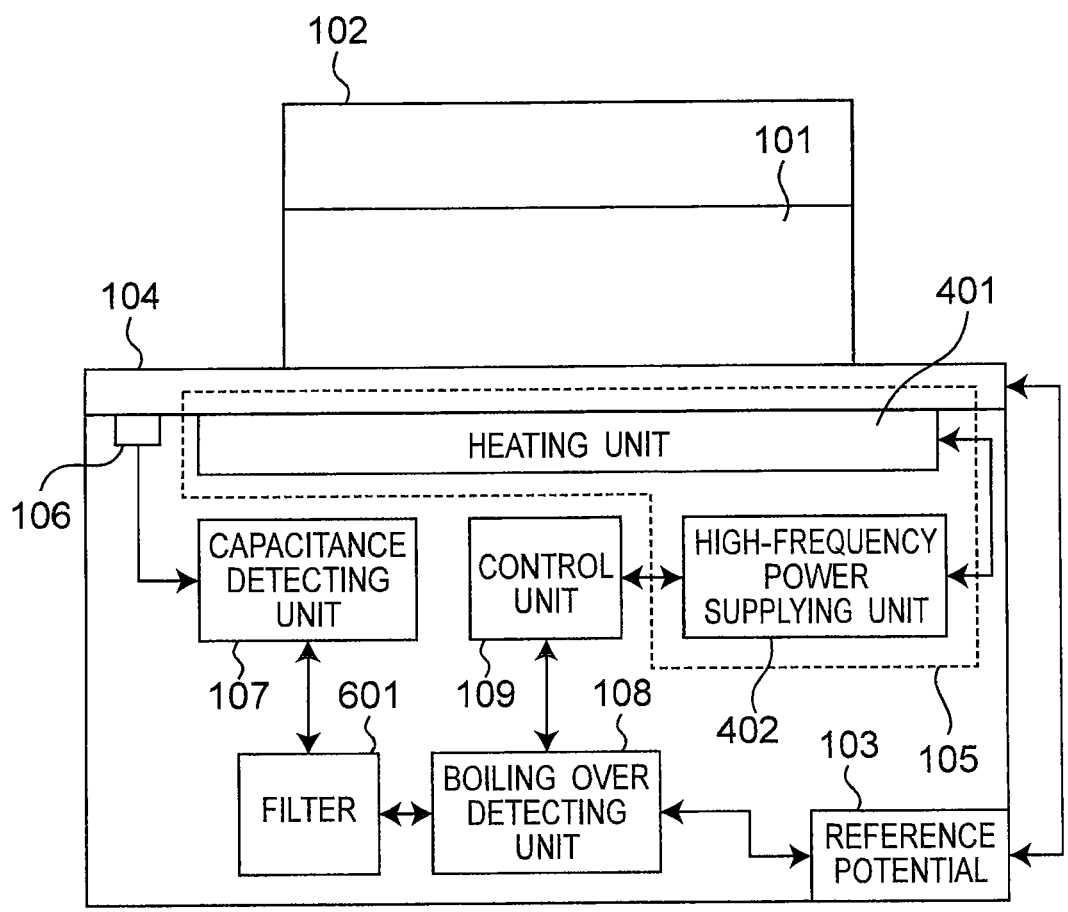
FIG. 6 is a block diagram showing still another structure of the heating/cooking equipment according to the first embodiment of the present invention.

As shown in FIG. 6, the heating/cooking equipment may further include a filter 601 that removes induction heating frequency components. As the filter 601, a band-pass filter that removes the induction heating frequency and that passes the frequency of the detection-purpose high-frequency power supply 201 shown in FIG. 2 can be used. In this case, when the boiling over detecting unit 108 acquires the output of the capacitance detecting unit 107, the filter 601 removes the induction heating frequency components superimposed on the electrode 106 from the heating coil 401 via the boiled over material, to stabilize the output of the capacitance detecting unit 107. Thus, the boiling over detecting unit 108 can detect boiling over, using the stabilized output of the capacitance detecting unit 107.

As described above, provision of the filter 601 for removing the induction heating frequency superimposed on the capacitance detecting unit 107 makes it possible to remove the effect of the induction heating caused by capacitive coupling between the electrode 106 and the heating coil 401 as the metal member, and to carry out detection of boiling over in a stable manner.

(Variation 3)

As shown in FIG. 7, a boiled over material contacting state detecting unit for detecting the contact state of the boiled over material may further be included. The boiled over material contacting state detecting unit 701 may easily be implemented by a microcomputer, for example.

When the boiled over material is small in amount, since the contact with the reference potential is insufficient, it is prone to be affected by the electric field, and the change in the electrostatic capacitance cannot fully be secured. Therefore, even when boiling over of the similar amount occurs, the boiling over detection state will greatly differ depending on whether or not the boiled over material and the object to be heated 102 are brought into contact with each other. The present Variation realizes the boiling over detection that is in accordance with whether or not the boiled over material is in contact with the object to be heated 102. In a case where the material to be cooked 101 boiled over on the electrode 106 is not in contact with the object to be heated 102, the voltage value detected by the capacitance detecting unit 107 reduces by the boiled over material. On the other hand, in a case where the material to be cooked 101 boiled over on the electrode 106 is in contact with the object to be heated 102, under the effect of the electric field generated by induction heating, the voltage value detected by the capacitance detecting unit 107 increases. Hence, the present Variation provides the heating/cooking equipment that is capable of detecting boiling over, even in a case where a change toward an increasing direction under the effect of the electric field generated by the induction heating of the object to be heated 102 is greater than a change toward a reducing direction due to the connection to the reference potential by the boiled over material being in contact with the object to be heated 102.

When the detection value of the capacitance detecting unit 107 is affected by the electric field generated by induction heating, the boiled over material contacting state detecting unit 701 shown in FIG. 7 determines whether or not boiling over is occurring based on the detection value of the electrostatic capacitance of the electrode 106 that the boiling over detecting unit 108 has acquired from the capacitance detecting unit 107. Specifically, while the boiling over detecting unit 108 determines whether or not boiling over is occurring based on a change in the reducing direction of the electrostatic capacitance, the boiled over material contacting state detecting unit 701 determines whether or not boiling over is occurring based on a change in the increasing direction of the electrostatic capacitance.

Figure 8A:
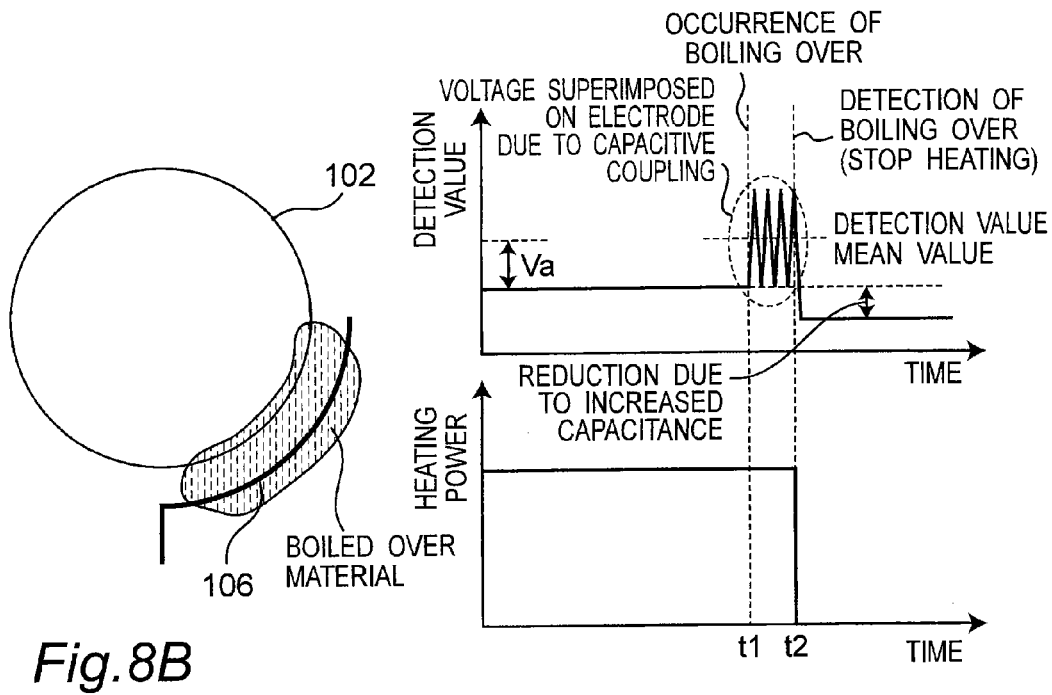
FIG. 8A is a diagram showing the effect of an electric field when the boiled over material is in contact with an object to be heated.
Figure 8B:
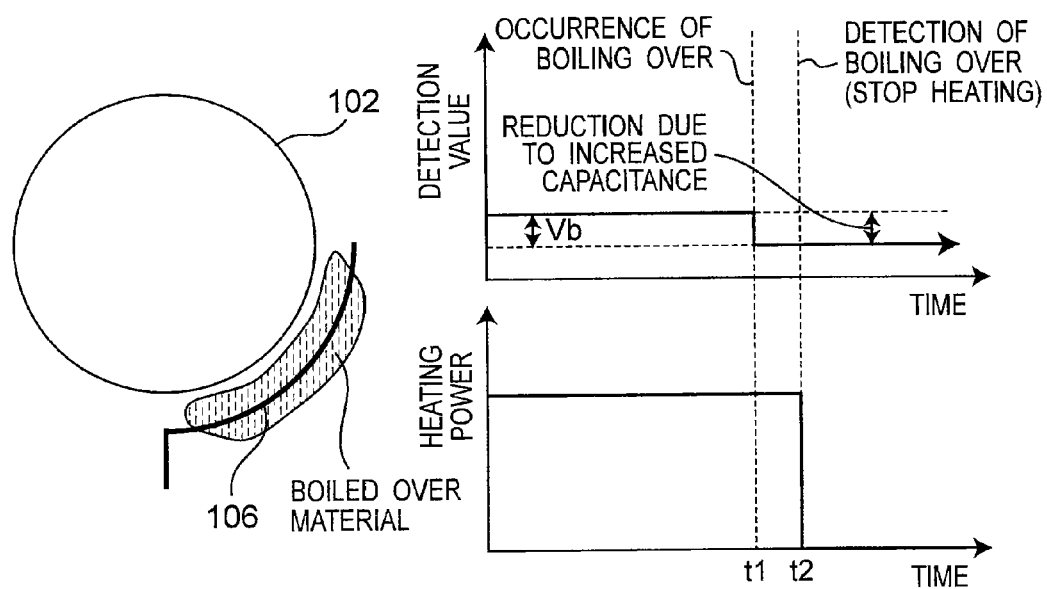
FIG. 8B is a diagram showing the effect of an electric field when the boiled over material is not in contact with the object to be heated.

FIG. 8A shows the detection value of the electrostatic capacitance in a case where a boiled over material is in contact with the object to be heated 102 (that is, under the effect of electric field generated by induction heating). FIG. 8B shows the detection value of the electrostatic capacitance in a case where a boiled over material is not in contact with the object to be heated 102 (that is, not under the effect of the electric field generated by induction heating).

As shown in FIG. 8B, when boiling over occurs, the electrostatic capacitance of the impedance component 205 due to the boiled over material shown in FIG. 2 increases, and the divided voltage value of the voltage detected by the detection voltage terminal 206 reduces (after time t1). At this time, when the boiled over material is not in contact with the object to be heated 102, since the electrode 106 and the object to be heated 102 do not capacitively couple with each other via boiling over material, the voltage value stabilizes in the reduced state without being affected by the electric field of induction heating. The boiling over detecting unit 108 determines whether or not boiling over is occurring based on whether or not the reduction amount is equal to or more than a prescribed value (a first prescribed value Vb).

On the other hand, as shown in FIG. 8A, in a case where a boiled over material makes contact with the object to be heated 102, and the electrode 106 and the object to be heated 102 capacitively couple with each other via the small amount of boiled over material physically attached to the object to be heated 102, via the boiled over material functioning as a dielectric, an electric field change that is directly transferred from the object to be heated 102 and that is originated from induction heating is produced. This electric field change is superimposed on the boiling over detection value with the frequency change of the induction heating via the capacitive coupling (time t1 to t2). At this time, the mean value of the detection value at the occurrence of boiling over shows a value greater than a value before the occurrence of boiling over. Accordingly, the boiled over material contacting state detecting unit 701 determines whether or not boiling over is occurring based on whether or not the increment is equal to or more than a prescribed value (a second prescribed value Va). When heating is stopped upon detection of boiling over, the voltage stabilizes in a reduced state, because it becomes free of the effect of the frequency components of the electric field generated by induction heating (after time t2).

FIG. 9 is a flowchart of a boiling over detection operation of the heating/cooking equipment according to Variation 3. In FIG. 9, S901 to S903 and S906 and S907 are identical to S301 to S303 and S306 and S307 in FIG. 3.

When the user puts the material to be cooked 101 in the object to be heated 102 and instructs to start heating, the control unit 109 operates the heating unit 105, to start heating the object to be heated 102 (S901). The boiling over detecting unit 108 acquires a voltage corresponding to the electrostatic capacitance of the electrode 106 output by the capacitance detecting unit 107 as a capacitance detection value, and substitutes the capacitance detection value at the start of heating into a "previous detection value" which is a variable for detecting boiling over (S902). Thereafter, the boiling over detecting unit 108 checks whether or not a prescribed time (for example, 0.5 seconds) has elapsed (S903). After a lapse of the prescribed time, the boiling over detecting unit 108 executes the boiling over detecting process (S904 to S907).

Specifically, the boiling over detecting unit 108 acquires the voltage corresponding to the electrostatic capacitance of the electrode 106 by the capacitance detecting unit 107 as the capacitance detection value, and substitutes the acquired capacitance detection value into a "present detection value" which is a variable for detecting boiling over (S904). At this time, since the capacitance detection value may possibly contain the frequency components of the electric field generated by the induction heating as shown in FIG. 8A, the boiling over detecting unit 108 substitutes, into the "present detection value", the value obtained by stabilizing the fluctuation that occurs with an induction heating frequency. For example, the boiling over detecting unit 108 substitutes a mean value of the detection values of a prescribed number of times (for example, eight times), or substitutes a value obtained by inserting an integrating circuit into the circuit, to thereby stabilize the fluctuation that occurs with the frequency of the electric field generated by induction heating.

The boiling over detecting unit 108 determines whether or not boiling over has occurred (S905). The boiling over detecting unit 108 determines whether or not the difference between the "previous detection value" and the "present detection value" of the electrostatic capacitance of the electrode 106 is greater than the first prescribed value (for example, 1/10 as great as the maximum voltage change amount). When the amount of the boiled over material is small and is not in contact with the object to be heated 102, as shown in FIG. 8B, the detection value (the voltage generated at the detection voltage terminal 206 shown in FIG. 2) reduces. Therefore, specifically, when the "present detection value" is smaller than the "previous detection value" by the first prescribed value (for example, 1/10 as great as the maximum voltage change amount) or more, the boiling over detecting unit 108 determines that boiling over has occurred.

Further, in Variation 3, the boiling over detecting unit 108 determines whether boiling over has occurred through the boiled over material contacting state detecting unit 701. Specifically, the boiled over material contacting state detecting unit 701 compares the difference between the "previous detection value" and the "present detection value" of the electrostatic capacitance of the electrode 106 acquired by the boiling over detecting unit 108 with the second prescribed value (for example, 1/10 as great as the maximum voltage change amount), thereby it is further determined whether or not a boiling over is occurring. When the difference between the "present detection value" and the "previous detection value" is greater than the second prescribed value, the boiled over material contacting state detecting unit 701 determines that boiling over has occurred; when the difference is smaller than the second prescribed value, the boiled over material contacting state detecting unit 701 determines that boiling over is not occurring. When the boiled over material is in contact with the object to be heated 102, as shown in FIG. 8A, the detection value (the voltage generated at the detection voltage terminal 206 shown in FIG. 2) increases, as being affected by the frequency of the electric field generated by induction heating. Hence, specifically, when the "present detection value" is greater than the "previous detection value" by a value equal to or more than the second prescribed value, the boiled over material contacting state detecting unit 701 determines that boiling over has occurred. The boiling over detecting unit 108 receives a detected result as to whether or not boiling over has occurred from the boiled over material contacting state detecting unit 701.

When boiling over has not occurred, the boiling over detecting unit 108 ends the boiling over detecting process, and again determines whether or not boiling over is occurring after a lapse of the prescribed time (return to S903). When boiling over has occurred, the control unit 109 changes the present heating amount to an adjusted heating amount (stop heating, an amount ⅓ as great as the heating amount or the like) (S906), then occurrence of boiling over is reported to the user by the reporting unit or the like (S907), and the boiling over detection operation ends.

As described above, when the material to be cooked 101 boiled over on the electrode 106 makes contact with the object to be heated 102, the electrode 106 and the object to be heated 102 capacitively couple with each other via a small amount of boiled over material physically attached to the object to be heated 102, thereby the boiled over material functions as a dielectric. Therefore, from the object to be heated 102 via the boiled over material, the effect of the electric field generated by induction heating is directly transferred to the electrode 106. The boiled over material contacting state detecting unit 701 can determine whether or not boiling over has occurred by recognizing the electric field change of induction heating-origin. Hence, it becomes possible to implement the heating/cooking equipment that is capable of detecting boiling over, even in a case where the boiled over material is in a small amount and is in contact with the object to be heated, and a change toward an increasing direction under the effect of the electric field generated by the induction heating of the object to be heated is greater than a change toward a reducing direction due to the connection to the reference potential.

(Variation 4)

Figure 10:
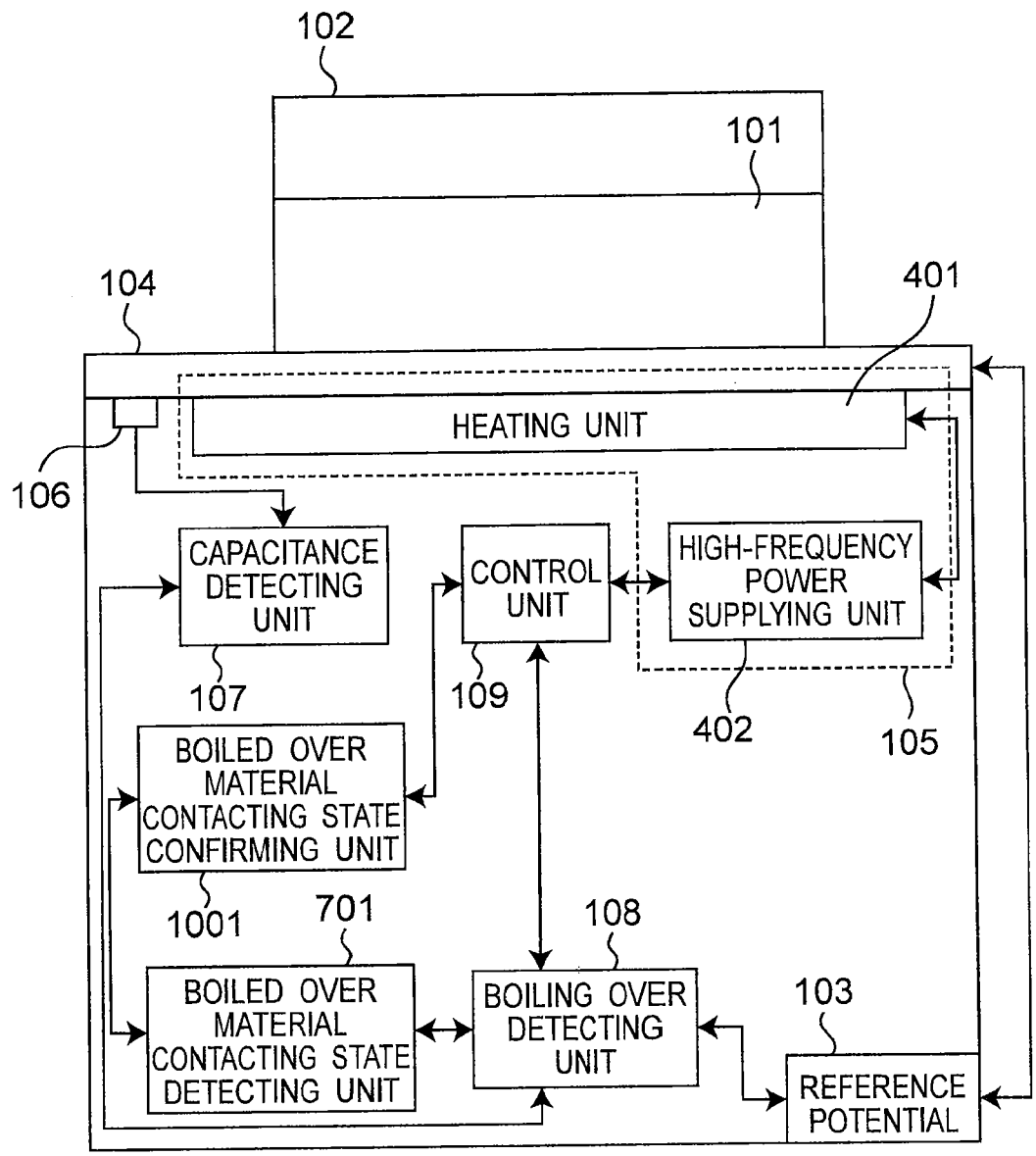
FIG. 10 is a block diagram showing still another structure of the heating/cooking equipment according to the first embodiment of the present invention.

It is to be noted that, in order to more surely carry out detection of boiling over, a boiled over material contacting state may be confirmed. FIG. 10 shows heating/cooking equipment of another structure. The heating/cooking equipment further includes a boiled over material contacting state confirming unit 1001 that confirms the boiled over material contacting state. The boiled over material contacting state confirming unit 1001 can easily be implemented by using a microcomputer.

Figure 11:
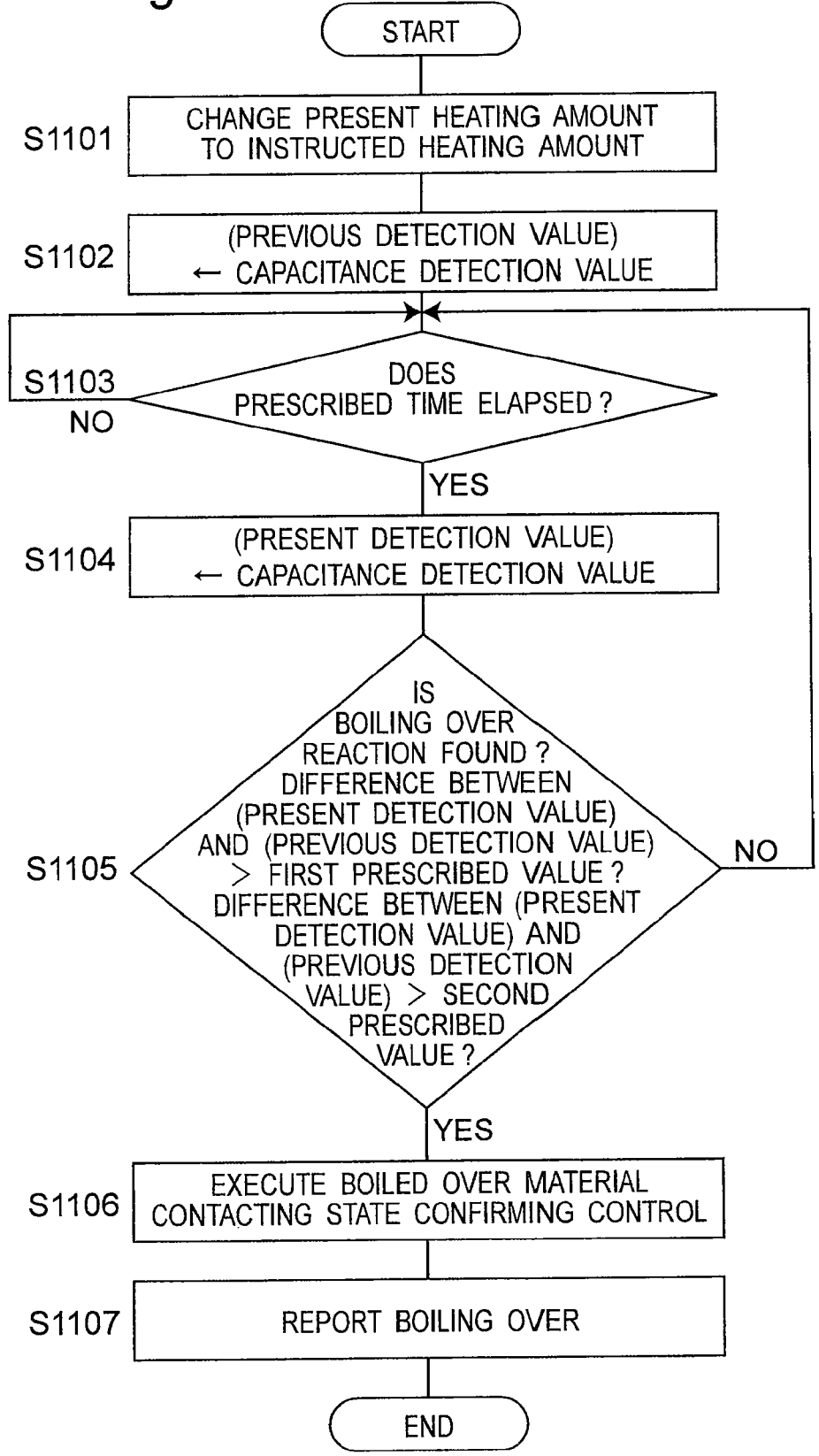
FIG. 11 is a flowchart showing a boiling over detection operation of the heating/cooking equipment shown in FIG. 10.

FIG. 11 shows a boiling over detection operation. FIG. 11 is different from FIG. 9 in that, in place of the step of changing the heating amount (S906), FIG. 11 includes the step of executing boiled over material contacting state confirming control (S1106). The other steps S1101 to S1105 and S1107 are identical to steps S901 to S905 and S907 in FIG. 9.

In FIG. 11, after the heating/cooking equipment carries out the boiling over detection operation (S1105), a boiled over material contacting state confirming operation as shown in FIG. 12 is carried out by the boiled over material contacting state confirming unit 1001 (S1106). The boiled over material contacting state confirming unit 1001 instructs the control unit 109 to confirm the boiled over material contacting state. Upon reception of the instruction, the control unit 109 once stops heating (time t2), and after a lapse of a prescribed time, power-on for confirming contact is carried out (time t3). When the power-on for confirming contact is carried out, the boiled over material contacting state confirming unit 1001 checks whether or not the output of the capacitance detecting unit 107 again exhibits an increasing reaction, through the boiled over material contacting state detecting unit 701. Here, the power turned on for confirming contact is set to heating power that is sufficiently smaller than that at the boiling over detection (for example, ⅓₀ as great as the maximum power). This prevents the boiled over material from evaporating under the effect of the heating power for confirming, which would otherwise invite a change in the state. When the power for confirming contact is turned on, in a case where the output of the capacitance detecting unit 107 again exhibits increasing reaction, the boiled over material contacting state confirming unit 1001 determines that the increase in the detection value of the capacitance detecting unit 107 is due to boiling over, and stops the heating operation through the control unit 109 (time t4).

By the boiled over material contacting state detecting unit 701 sensing an increase in the detection value of the capacitance detecting unit 107, and thereafter the boiled over material contacting state confirming unit 1001 confirming in an increase in the detection value, it becomes possible to correctly determine that the increase in the detection value under the effect of induction heating is due to boiling over. That is, by carrying out the operation of step S1106, it becomes possible to confirm that the boiling over detection carried out by the boiled over material contacting state detecting unit 701 is not an erroneous detection caused by noise or the like, but is the increase in the detection value caused by the boiled over material actually being brought into contact with the object to be heated 102. Further, since such confirmation is carried out with low heating power, confirmation can be carried out without disturbing the boiled over state.

It is to be noted that, upon the occurrence of boiling over under the effect of the electric field generated by induction heating, the detection value of the capacitance detecting unit 107 increases in accordance with an amount of heating power. Hence, it is preferable that the boiled over material contacting state confirming unit 1001 confirms that the increment of the detection value of the capacitance detecting unit 107 is a value corresponding to the amount of heating power, and then determines that the increase in the detection value is due to boiling over. For example, when heating is started in a state where the object to be heated 102 is placed on the electrode 106, and thereafter the object to be heated 102 is shifted to be out of the region above the electrode 106, a detection value of the capacitance detecting unit 107 increases, despite absence of an occurrence of boiling over. In such a case, after the object to be heated 102 is shifted to be out of the region above the electrode 106, detection value of the capacitance detecting unit 107 becomes a constant value, irrespective of the amount of heating power. Therefore, in a case where the boiled over material contacting state detecting unit 701 once senses an increase in the detection value of the electrostatic capacitance due to a shift of the object to be heated 102 as an occurrence of boiling over, and thereafter the boiled over material contacting state confirming unit 1001 supplies weak contact confirming—purpose power to the heating coil 401, no effect of the electric field generated by induction heating is present. Therefore, the value identical to that at the time of heating before detection of boiling over is detected. Hence, the boiled over material contacting state confirming unit 1001 can correctly determine that the increase in the detection value is due to boiling over, by confirming whether or not the increment of the detection value of the capacitance detecting unit 107 is the value in accordance with the amount of the heating power.

As described above, the boiled over material contacting state confirming unit 1001 confirms whether or not the boiled over material contacting state to the object to be heated 102, which has been detected by the boiled over material contacting state detecting unit 701 (that is, the determination that the increase in the detection value of the capacitance detecting unit 107 is due to boiling over), by carrying out the state confirming-purpose heating control. Thus, it becomes possible to correctly and surely detect whether or not boiling over is occurring.

As described above, in the heating/cooking equipment according to each of the first embodiment and Variations, the top plate 104 is connected to the reference potential. Accordingly, by exploiting the phenomenon in which the moisture contained in the boiled over material to be cooked functions as a dielectric and the connection between the electrode 106 and the reference potential by capacitive coupling further enhances in accordance with an increase in the amount of the boiled over material, it becomes possible to recognize a change in the electrostatic capacitance, to thereby detect boiling over. Hence, a highly practical boiling over detection can be realized. Such heating/cooking equipment is useful for general heating/cooking equipment. Further, the boiling over detection operation can be applied not only to the heating/cooking equipment, but also can widely be applied to devices in which any substance possessing high permittivity such as water must be detected.

Second Embodiment

Heating/cooking equipment according to a second embodiment of the present invention is configured to: when it is assumed that boiling over has occurred, execute heating amount control for preventing boiling over continuation once; thereafter, determine whether or not it is actually boiling over; then fix the heating amount control; and determine whether to report the occurrence about boiling over or to recover the original heating amount. This makes it possible to accurately make a determination as to boiling over, and the heating/cooking equipment possessing a highly practical boiling over sensing function can be implemented.

2.1 Structure of Heating/Cooking Equipment

FIG. 13 shows the structure of the heating/cooking equipment according to the second embodiment of the present invention. The heating/cooking equipment according to the present embodiment includes: a top plate 104 on which an object to be heated 102 is placed; a heating coil 401 that heats the object to be heated 102; a high-frequency power supplying unit 402 that supplies the heating coil 401 with electric power; and a control unit 109 that controls a heating operation of the heating coil 401 by controlling the high-frequency power supplying unit 402. The heating/cooking equipment according to the present embodiment further includes: an electrode 106 that is arranged on the lower surface of the top plate 104; a capacitance detecting unit 107 that detects the electrostatic capacitance of the electrode 106; a reporting unit 140; and a control report time adjusting unit 130 that controls the reporting unit 140 and the control unit 109. The heating coil 401 and the high-frequency power supplying unit 402 structure a heating unit 105 similarly to that shown in FIG. 1. Preferably, the top plate 104 is connected to the reference potential as in the first embodiment. In FIG. 13, identical reference characters are allotted to the components identical to those in FIGS. 1 and 4. The heating/cooking equipment according to the present embodiment is induction heating/cooking equipment that inductively heats the object to be heated 102 by the heating unit 105.

The structure of the present embodiment can easily be implemented by: using a crystallized glass as the top plate 104; using an inverter as the high-frequency power supplying unit 402; using a conductor that is formed on the lower surface of the top plate 104 by application or adhesive bonding as the electrode 106; using a circuit that converts the electrostatic capacitance of the electrode 106 into a voltage as the capacitance detecting unit 107; using a microcomputer as each of the control report time adjusting unit 130 and the control unit 109; and using an LED as the reporting unit 140.

The electrode 106 formed on the lower surface of the top plate 104 forms a capacitor with an electric conductor on the top plate 104. Normally, nothing exists on the top plate 104 and, therefore, air serves as a dielectric. In a case where any other objects such as the object to be heated 102, the finger of the user, liquid, and the material to be cooked 101 exist on the top plate 104, since they are different from one another in relative permittivity, the electrostatic capacitance of the capacitor structured by the electrode 106 changes. The capacitance detecting unit 107 converts the electrostatic capacitance obtained by the electrode 106 successively into a voltage, and outputs the detected voltage value to the control report time adjusting unit 130.

The control report time adjusting unit 130 determines whether or not boiling over has occurred, based on the voltage value detected by the capacitance detecting unit 107. That is, the control report time adjusting unit 130 shown in FIG. 13 is an equivalent of the boiling over detecting unit 108 shown in FIGS. 1 and 4 and others, which determines whether or not boiling over has occurred. It is to be noted that, the control report time adjusting unit 130 of the present embodiment stops heating by the heating coil 401 or reduces the heating amount through the control unit 109 when it is assumed that boiling over has occurred; and thereafter, when the control report time adjusting unit 130 determines that the occurrence of boiling over is sure, it reports the occurrence of boiling over to the user through the reporting unit 140.

2.2 Operation of Heating/Cooking Equipment

A description will be given of the operation of the heating/cooking equipment according to the present embodiment structured as described above.

Figure 14:
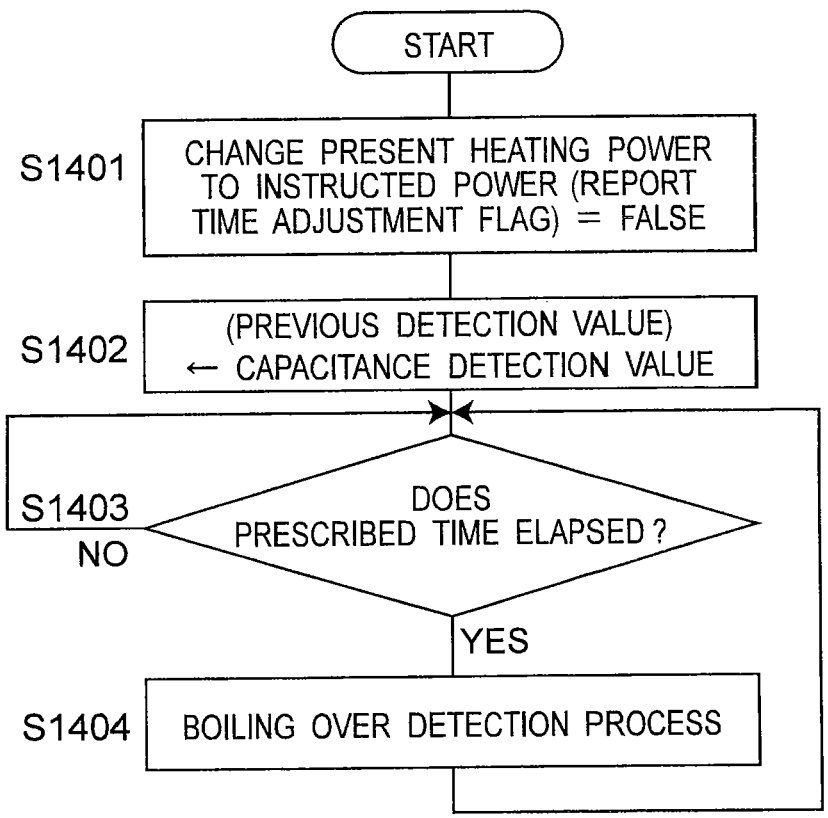
FIG. 14 is a flowchart showing an overall operation of the heating/cooking equipment according to the second embodiment of the present invention.

FIG. 14 shows an overall operation of the boiling over detection. When the user puts the material to be cooked 101 in the object to be heated 102 and instructs to start heating, the control unit 109 operates the high-frequency power supplying unit 402, to supply the heating coil 401 with high-frequency power. At this time, the control unit 109 sets, to False (false), a "report time adjustment flag", which indicates that boiling over reporting time adjustment is in progress (S1401). The control report time adjusting unit 130 acquires a detection value of the electrostatic capacitance of the electrode 106 detected by the capacitance detecting unit 107, and substitutes the capacitance detection value at the start of heating into a "previous detection value" which is a variable for detecting boiling over (S1402). Thereafter, the control unit 109 checks whether or not a prescribed time (for example, 0.2 seconds) has elapsed (S1403), and executes the boiling over detecting process every lapse of the prescribed time (S1404).

Figure 15:
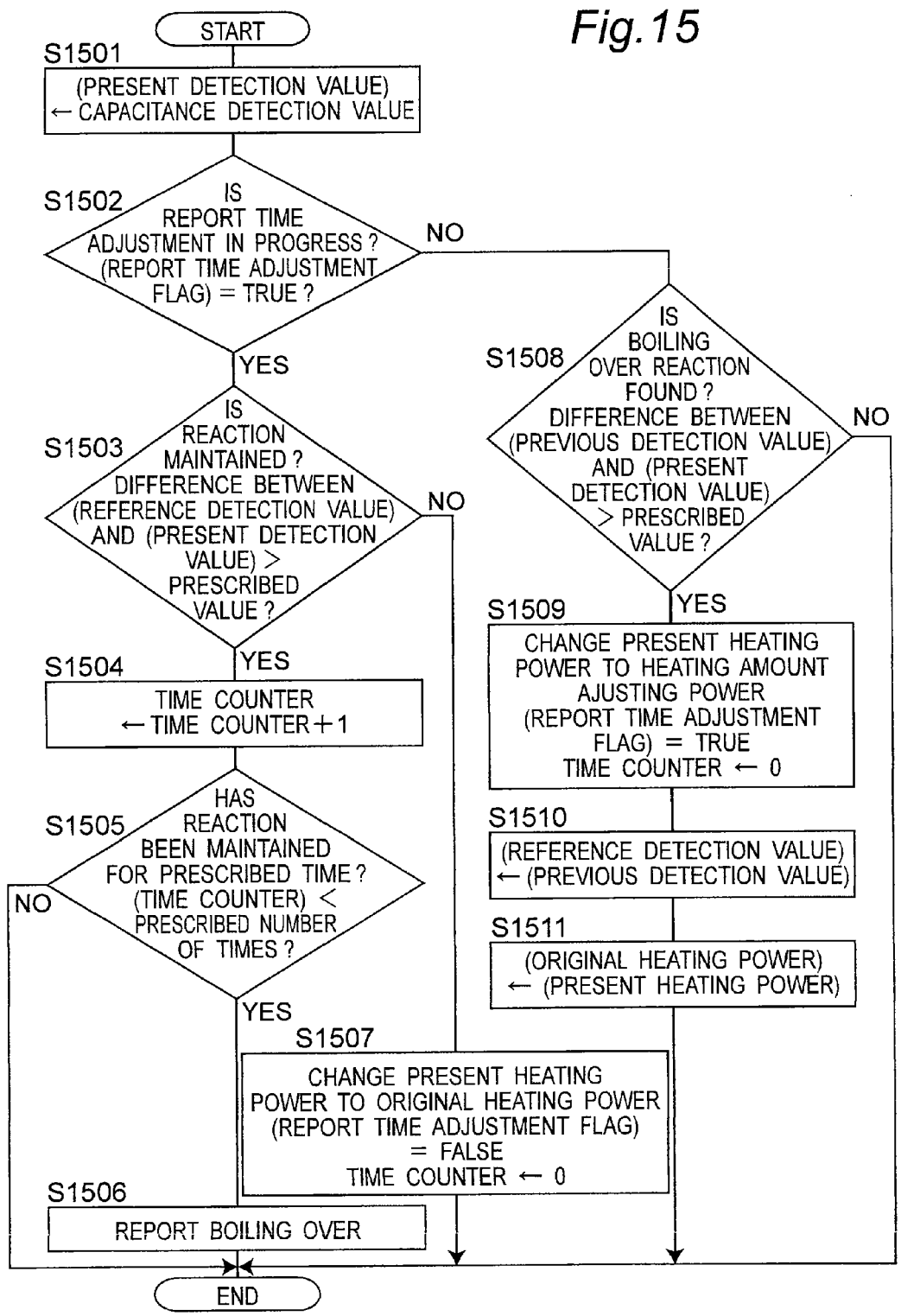
FIG. 15 is a flowchart showing a boiling over detection operation of the heating/cooking equipment according to the second embodiment of the present invention.
Figure 16A:
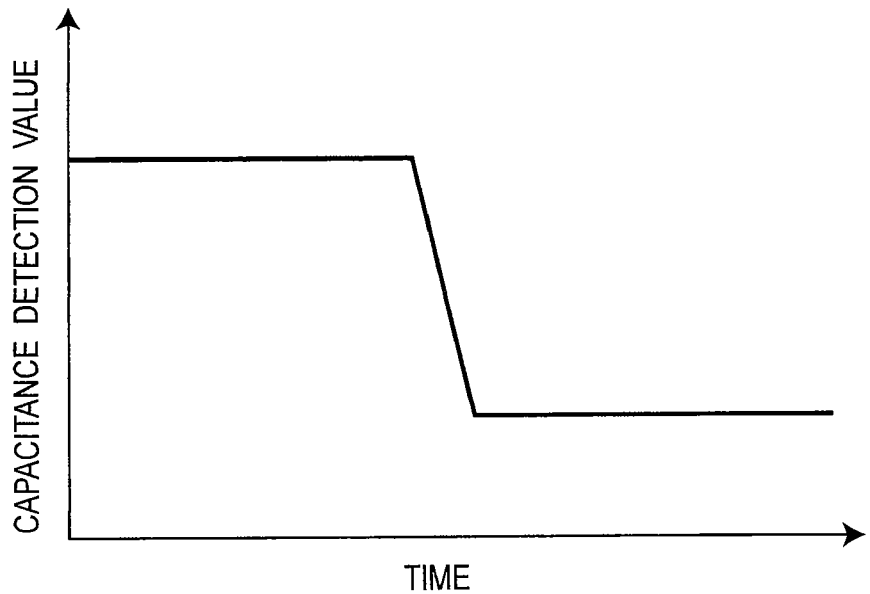
FIG. 16A is a diagram showing the detection value of the electrostatic capacitance upon occurrence of boiling over.
Figure 16B:
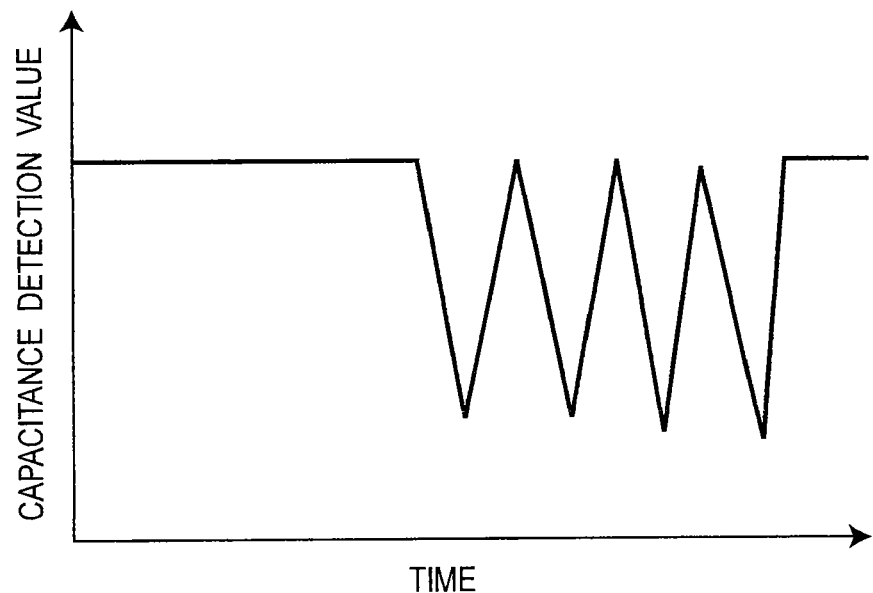
FIG. 16B is a diagram showing the detection value of the electrostatic capacitance without the occurrence of boiling over.

FIG. 15 shows details of the boiling over detecting process (S1404). FIG. 16A and FIG. 16B show changes in the electrostatic capacitance of the electrode 106 detected by the capacitance detecting unit 107. FIG. 16A shows a change in the detection value (voltage value) of the electrostatic capacitance upon occurrence of boiling over. As shown in FIG. 16A, when boiling over occurs, the detection value of the electrostatic capacitance reduces. On the other hand, FIG. 16B shows temporal changes in the detection value of the electrostatic capacitance caused by a factor other than boiling over. Specifically, FIG. 16B shows changes in the detection value of the electrostatic capacitance (voltage value), when the top plate 104 is wipe-cleaned using a kitchen cloth or the like. During the wipe-cleaning, the detection value of the electrostatic capacitance repeatedly increases and decreases. In the present embodiment, it is determined whether any change in the detection value of the electrostatic capacitance is due to boiling over, and a process upon occurrence of boiling over is executed.

In FIG. 15, when the boiling over detecting process is started, the capacitance detecting unit 107 detects the electrostatic capacitance of the electrode 106. The control report time adjusting unit 130 substitutes the detection value of the electrostatic capacitance detected by the capacitance detecting unit 107 into the "present detection value" which is a variable for detecting boiling over (S1501). The control report time adjusting unit 130 checks whether the report time adjustment in progress flag is True (true) (S1502). Since the report time adjustment in progress flag is set to False (false) at step S1401 in FIG. 14, when it is the first boiling over detection, the control proceeds to step S1508. In this case, the control report time adjusting unit 130 checks whether the boiling over reaction as shown in FIG. 16A is newly detected (S1508 to S1511). On the other hand, at step S1509 in FIG. 15, the report time adjustment in progress flag is set to True (true). Therefore, when it is the second boiling over detection, the control proceeds to step S1503. In this case, it is determined whether the change in the detection value of the electrostatic capacitance detected for the first time is actually due to boiling over. Specifically, it is determined whether the boiling over reaction as shown in FIG. 16A is maintained, or it is a temporary reaction due to wipe-cleaning as shown in FIG. 16B (S1503 to 1507).

Specifically, when the report time adjustment in progress flag is False (false) (No at S1502), the control report time adjusting unit 130 determines that adjustment is not in progress. That is, the first boiling over detection is determined. In this case, the control report time adjusting unit 130 compares the difference between the "previous detection value" and the "present detection value" of the electrostatic capacitance of the electrode 106 with a prescribed value (for example, ⅓ as great as the maximum voltage change), to determine whether or not boiling over is present (S1508). When boiling over is not detected, the detection process ends. When boiling over is detected, the control report time adjusting unit 130 changes the present heating amount to heating amount adjusting power (stop or temperature maintaining-purpose power of about 500 W) through the control unit 109 (S1509). For the purpose of confirming that the change in the electrostatic capacitance is due to boiling over in a later step, the control report time adjusting unit 130 sets, through the control unit 109, the report time adjustment in progress flag to True (true), and sets the "time counter" for measuring time for checking to 0. Thereafter, the report time adjusting unit 130 starts the report time adjusting process. Here, the report time adjusting unit 130 stores, as the reference data for determining the boiling over continuation, a "previous detection value" which is the capacitance detection value before the boiling over detection as the "reference detection value" (S1510). Further, "present heating power", which will become necessary for recovering the heating amount upon determination of a temporary reaction as shown in FIG. 16B, is stored as the variable of the "original heating power" indicative of the recovery-purpose power (S1511), and the process in FIG. 15 ends. Thereafter, every lapse of the prescribed time (S1403 in FIG. 14), the boiling over detecting process (S1404) is carried out. That is, after a lapse of the prescribed time, the heating/cooking equipment again starts the process that starts from step S1501 shown in FIG. 15. At this time, since the report time adjustment in progress flag is set to True (true) at step S1509, the control proceeds from step S1502 to step S1503.

When the report time adjustment in progress flag is True (true) (Yes in S1502), the control report time adjusting unit 130 determines that adjustment is in progress. That is, it determines that boiling over is once detected, and heating power is temporarily being adjusted. In this case, the control report time adjusting unit 130 determines whether the boiling over reaction continues, by comparing the difference between the "reference detection value" and the "present detection value" of the electrostatic capacitance of the electrode 106 with a prescribed value (for example, ⅓ as great as the maximum voltage change) (S1503).

When the difference between the "reference detection value" and the "present detection value" of the electrostatic capacitance of the electrode 106 does not reach the prescribed value (No at S1503), the control report time adjusting unit 130 determines that the change in the electrostatic capacitance is not due to boiling over (for example, is due to wipe-cleaning as shown in FIG. 16B), and through the control unit 109, controls the present heating amount to recover the value of the "original heating power" (S1507). Further, the control report time adjusting unit 130 sets, through the control unit 109, the report time adjustment in progress flag to False (false), and sets the time counter to 0. This fixes that the change in the electrostatic capacitance is the temporary reaction, and the reporting time adjustment ends.

On the other hand, when the difference between the "reference detection value" and the "present detection value" of the electrostatic capacitance of the electrode 106 is greater than a prescribed value (Yes at S1503), the control report time adjusting unit 130 determines that the change in the electrostatic capacitance is due to boiling over. In this case, the control report time adjusting unit 130 increments the "time counter" that counts the continuation time of boiling over (S1504). The control report time adjusting unit 130 determines whether or not continuation time of the boiling over reaction continues for a prescribed time (for example, 5 seconds), based on whether or not the time counter exceeds prescribed number of times (S1505). When the continuation time of the boiling over reaction is longer than the prescribed time, the control report time adjusting unit 130 fixes the occurrence of boiling over. The control report time adjusting unit 130 reports the occurrence of boiling over to the user through the reporting unit 140, and maintains the heating amount adjusting power state (stop or temperature maintaining-purpose power of about 500 W) (S1506). When the continuation time of the boiling over reaction is shorter than the prescribed time, the process is once stopped. Thereafter, every lapse of a prescribed time (for example, 0.2 seconds) (S1403 in FIG. 14), the boiling over detecting process (S1404) is executed. That is, after a lapse of the prescribed time (for example, 0.2 seconds), again, the process that starts from step S1501 in FIG. 15 is executed, the control report time adjusting unit 130 executes reporting the boiling over, at a time point where the continuation time of the boiling over reaction exceeds a prescribed time (for example, 5 seconds).

2.3 Conclusion

Since the induction heating/cooking equipment does not utilize fire, the user often uses the top plate 104 as part of a countertop. Further, because no flame exists, in some cases, the user may wipe-clean over the top plate 104 with the kitchen cloth even during heating. When ingredients, eating utensils, and cooking utensils are shifted, or wipe-cleaning with a kitchen cloth is carried out on the top plate 104 as the countertop, a change in the electrostatic capacitance of the electrode 106 may be observed. Accordingly, in a case where the process is performed simply based on a determination that the observed change in the electrostatic capacitance of the electrode is due to boiling over, heating amount control unintended for the user may frequently be performed. However, with the heating/cooking equipment according to the present embodiment, the control report time adjusting unit 130 once stops heating or reduces the heating amount upon a change in the electrostatic capacitance of the electrode 106. That is, the heating amount control is executed, the heating amount control being intended to prevent the boiled over material from spreading, which is required upon an occurrence of boiling over of the material to be cooked 101. Thereafter, the control report time adjusting unit 130 confirms whether or not the change in the electrostatic capacitance of the electrode 106 is actually due to boiling over, and then reports it to the user or recovers the heating power. Hence, detection of boiling over can accurately be performed, and the heating/cooking equipment possessing the highly practical boiling over sensing function can be implemented.

It is to be noted that, in the present embodiment, when the boiling over reaction does not continue, the heating power is immediately recovered (S1507). However, after step S1503, the heating power may be recovered after a determination whether or not a prescribed time has elapsed is made. Further, the heating power may be recovered based on whether or not the mean value of the detection values of the electrostatic capacitance within a prescribed time period is equal to or more than a prescribed value.

2.4 Variations

It is to be noted that the heating/cooking equipment of the present invention is not limited to the second embodiment described above, and may be structured as follows.

(Variation 1)

Figure 17:
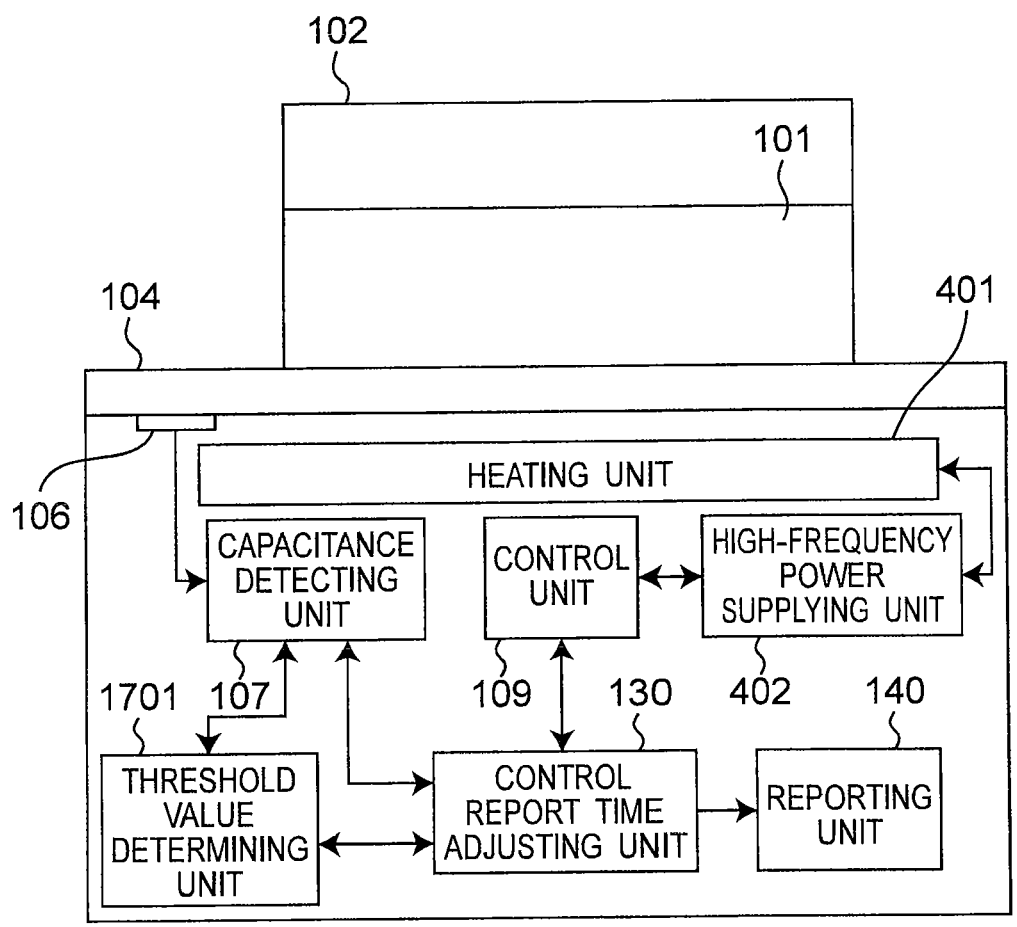
FIG. 17 is a block diagram showing another structure of the heating/cooking equipment according to the second embodiment of the present invention.

As shown in FIG. 17, a threshold value determining unit 1701 that determines a detection threshold value of the electrostatic capacitance change when making a determination as to boiling over may further be included. The threshold value determining unit 1701 can easily be implemented by using a microcomputer. The basic operation is similar to that of the second embodiment. However, in Variation 1, as the prescribed value used at steps S1503 and S1508 in FIG. 15, a threshold value in accordance with the situation is used. Specifically, the prescribed value is determined based on whether or not a pot being the object to be heated 102 is placed on the electrode 106 when the user instructs to start heating. That is, based on the value of the electrostatic capacitance of the electrode 106 at the start of heating, the prescribed value used in detecting boiling over at steps S1503 and S1508 is determined.

Figure 18A:
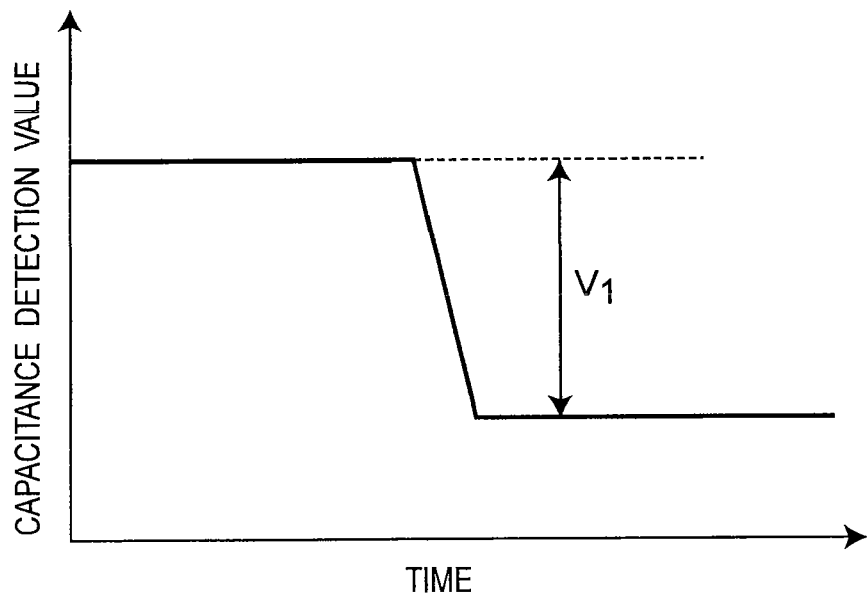
FIG. 18A is a diagram showing a change in the detection value of the electrostatic capacitance when the object to be heated is not on the electrode.
Figure 18B:
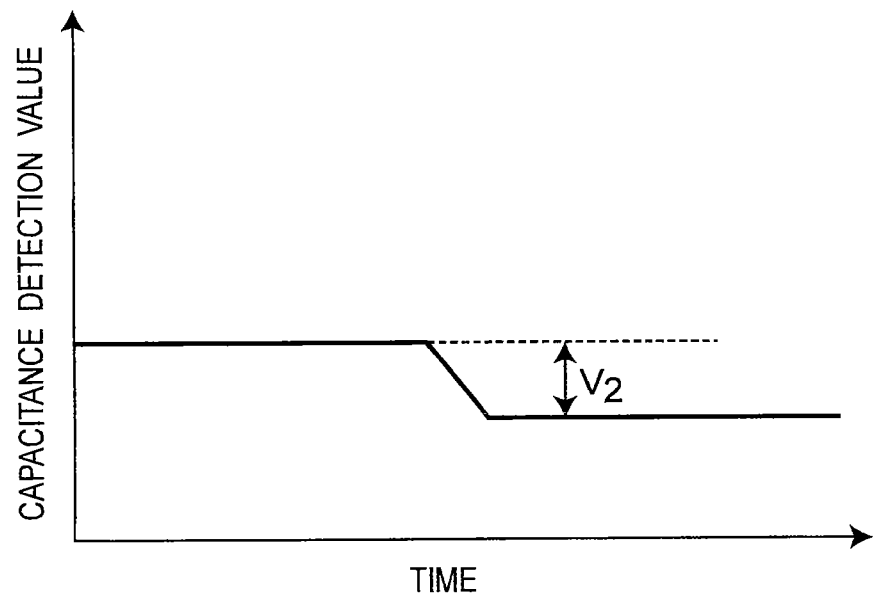
FIG. 18B is a diagram showing a change in the detection value of the electrostatic capacitance when the object to be heated is on the electrode.

FIG. 18A shows a detection value of the electrostatic capacitance (voltage value) where the object to be heated 102 is not placed on the electrode 106. FIG. 18B shows a detection value of the electrostatic capacitance (voltage value) when the object to be heated 102 is placed on the electrode 106. As shown in FIG. 18A and FIG. 18B, when the object to be heated 102 is placed on the electrode 106, the electrostatic capacitance of the electrode 106 becomes smaller than that when the object to be heated 102 is not placed on the electrode 106. Therefore, a change in the detection value before and after the occurrence of boiling over becomes smaller (V2<V1). When the object to be heated 102 exists on the electrode 106, the capacitance detection value detected by the capacitance detecting unit 107 is a value which is in accordance with the material or shape of the pot. The threshold value determining unit 1701 always monitors the difference between the detection value where the object to be heated 102 is not placed (corresponding to the maximum value of the electrostatic capacitance sensed output) and the present detection value. The threshold value determining unit 1701 has a function of providing a detection threshold value for making a boiling over determination in a state where a certain degree of electrostatic capacitance change has already been caused by the object to be heated 102 (for example, a state where the electrostatic capacitance is reduced by an amount equal to or more than a prescribed amount).

When heating is started, the control report time adjusting unit 130 queries the threshold value determining unit 1701, to request the threshold value used in detecting boiling over. The threshold value determining unit 1701 normally (when the object to be heated 102 is not placed on the electrode 106) passes a value ⅓ as great as the maximum voltage change amount as the threshold value. On the other hand, in a case where an initial electrostatic capacitance change as in FIG. 18B is occurring at the start of heating, the threshold value determining unit 1701 determines a detection threshold value (that is, the prescribed value used at steps S1503 and S1508 in FIG. 15) based on a prescribed calculation formula, and passes it to the control report time adjusting unit 130. A prescribed calculation formula is, for example: "(the maximum voltage change amount)−((an output without a pot)−(an output with a pot))×⅓". The control report time adjusting unit 130 uses the threshold value obtained in this manner, to carry out a boiling over detection operation similarly to that carried out in the second embodiment.

As described above, in the case where the object to be heated 102 is placed on the electrode 106, and a certain degree of electrostatic capacitance change from the heating start time point has already occurred, the threshold value of the electrostatic capacitance change for the threshold value determining unit 1701 to detect boiling over is set to be smaller than that in a case where the object to be heated 102 is not on the electrode 106. Hence, irrespective of the placement state of the object to be heated 102, the boiling over detection sensitivity can be secured.

(Variation 2)

Figure 19:
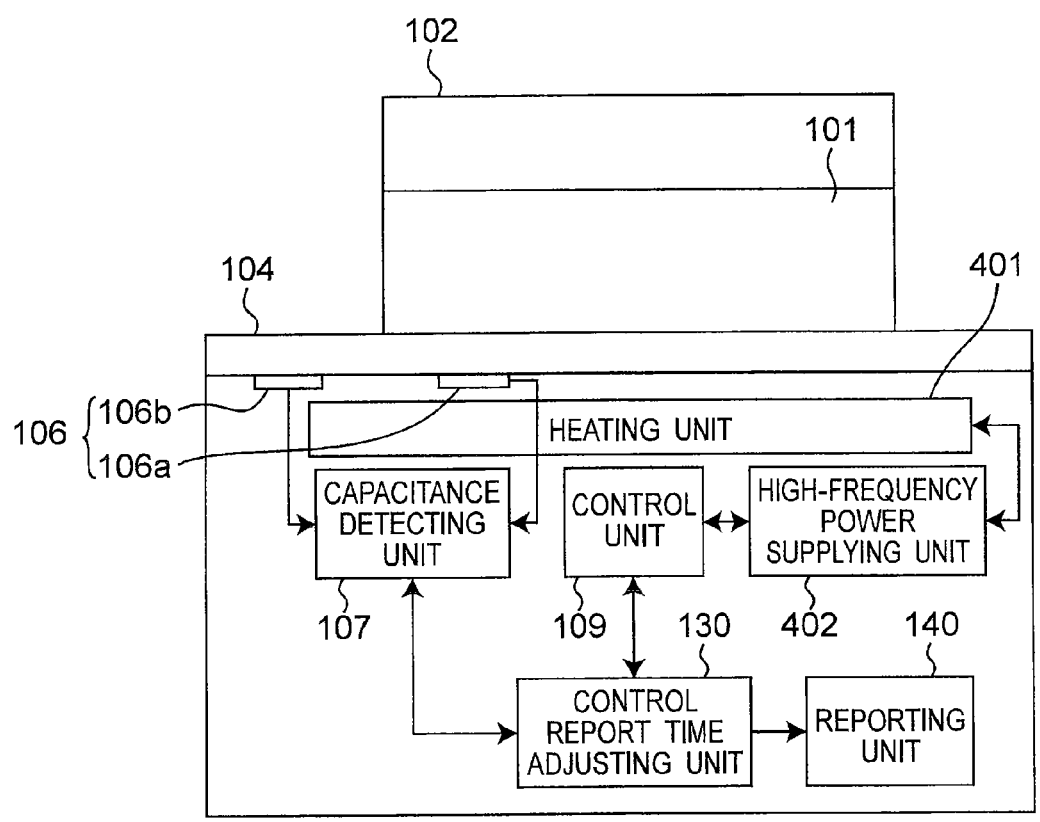
FIG. 19 is a block diagram showing another structure of the heating/cooking equipment of the second embodiment according to the present invention.

In the second embodiment, one electrode 106 is used. However, as shown in FIG. 19, a plurality of electrodes 106a and 106b may be used. For example, the heating/cooking equipment may include the electrode 106 that includes the electrode 106a arranged near the object to be heated 102, and the electrode 106b arranged away therefrom. In this case, boiling over can be detected using a plurality of electrodes 106a and 106b. It is also possible to exert heating amount control that is in accordance with the placement state or size of the object to be heated 102 and a boiled over amount of the material to be cooked 101. For example, when a electrostatic capacitance change occurs only at the electrode 106a, and no electrostatic capacitance change occurs at the electrode 106b, it can be determined that the boiled over material of the material to be cooked 101 from the object to be heated 102 is in just a small amount, which is present around the object to be heated 102. Hence, in adjusting the heating amount at S1509 in FIG. 15, the control report time adjusting unit 130 adjusts the heating amount by a smaller amount than in doing so in a case where an electrostatic capacitance change occurs in each of the electrode 106a and the electrode 106b. For example, when the electrostatic capacitance changes at both the electrode 106a and the electrode 106b, the heating amount is changed to 500 W, and when the electrostatic capacitance changes solely at the electrode 106a, it is set to 750 W. In this manner, by carrying out the boiling over detecting process taking into consideration of the position of each of the electrode 106 and the object to be heated 102, it becomes possible to reduce the heating amount just by the required amount, the reduction of which may otherwise prolong the cooking time.

Further, in a case where a plurality of electrodes 106 are respectively arranged at positions covering the region of the object to be heated 102 of a large size, and where a change is observed in the electrostatic capacitance of every one of the electrodes 106 from a heating start time point, it can be determined that the object to be heated 102 being placed on is a large pot. For example, in a case where the electrostatic capacitance of every one of the electrodes 106 from the heating start time point deviates from the value of a case where no pot is placed by a value equal to or more than a prescribed amount, it is considered that an object to be heated 102, size of which is large enough to cover all the electrodes 106, is placed on the top plate 104. In a case where a pot being the object to be heated 102 is great and is present on the electrode 106, the effect of cleaning or cooking utensils cannot be involved, and therefore such situation will not be confused with the actual situation in making a determination. Further, in a case where boiling over occurs in this situation, the boiled over material to be cooked 101 passes through a narrow gap between the object to be heated 102, which is heated and attained a high temperature, and the top plate 104 until it reaches the electrode 106. Accordingly, when a reaction of the change in the electrostatic capacitance at the electrode 106 is recognized, the control report time adjusting unit 130 immediately stops heating and makes a report, such that the boiled over material to be cooked 102 will not burns onto the top plate 104. Even in a case where the object to be heated 102 of a large size is heated, the aforementioned operation makes it possible to address the situation where it takes time for the boiled over material to be cooked 101 to reach the upper portion of the electrode 106 without the effect of cleaning and the material to be cooked.

Further, in a case where there is, out of a plurality of electrodes 106, at least one electrode whose electrostatic capacitance shows a change at the start of heating, and further, an additional change amount occurs at that electrode 106 whose electrostatic capacitance has been showing the change at the heating start time point, the boiled over material to be cooked 101 passes through a narrow gap between the object to be heated 102 being heated and attained a high temperature and the top plate 104 before it reaches the electrode 106. Therefore, in the case where a reaction of a change in the electrostatic capacitance of the electrode 106 is recognized at the heating start time point, it is preferable that the control report time adjusting unit 130 immediately stops heating and makes a report, such that the boiled over material to be cooked 101 will not burn onto the top plate 104. In a case where a electrostatic capacitance change occurs at any electrode 106 at which no electrostatic capacitance change was seen at the heating start time point, it may be addressed by adjusting the heating amount (for example, reducing the power to 500 W). In this manner, it may be determined that the material to be cooked 101 has spilled over the portion where the object to be heated 102 is present on the electrode 106, and based on the determination, heating may be stopped for preventing burning of the material and a report may be made about execution of the heating amount control.

As described above, by making various determinations based on electrostatic capacitance changes of a plurality of electrodes 106, it becomes possible to exert the heating amount control that is in accordance with the placement state or size of the object to be heated 102, and the boiled over amount of the material to be cooked.

(Variation 3)

Figure 20:
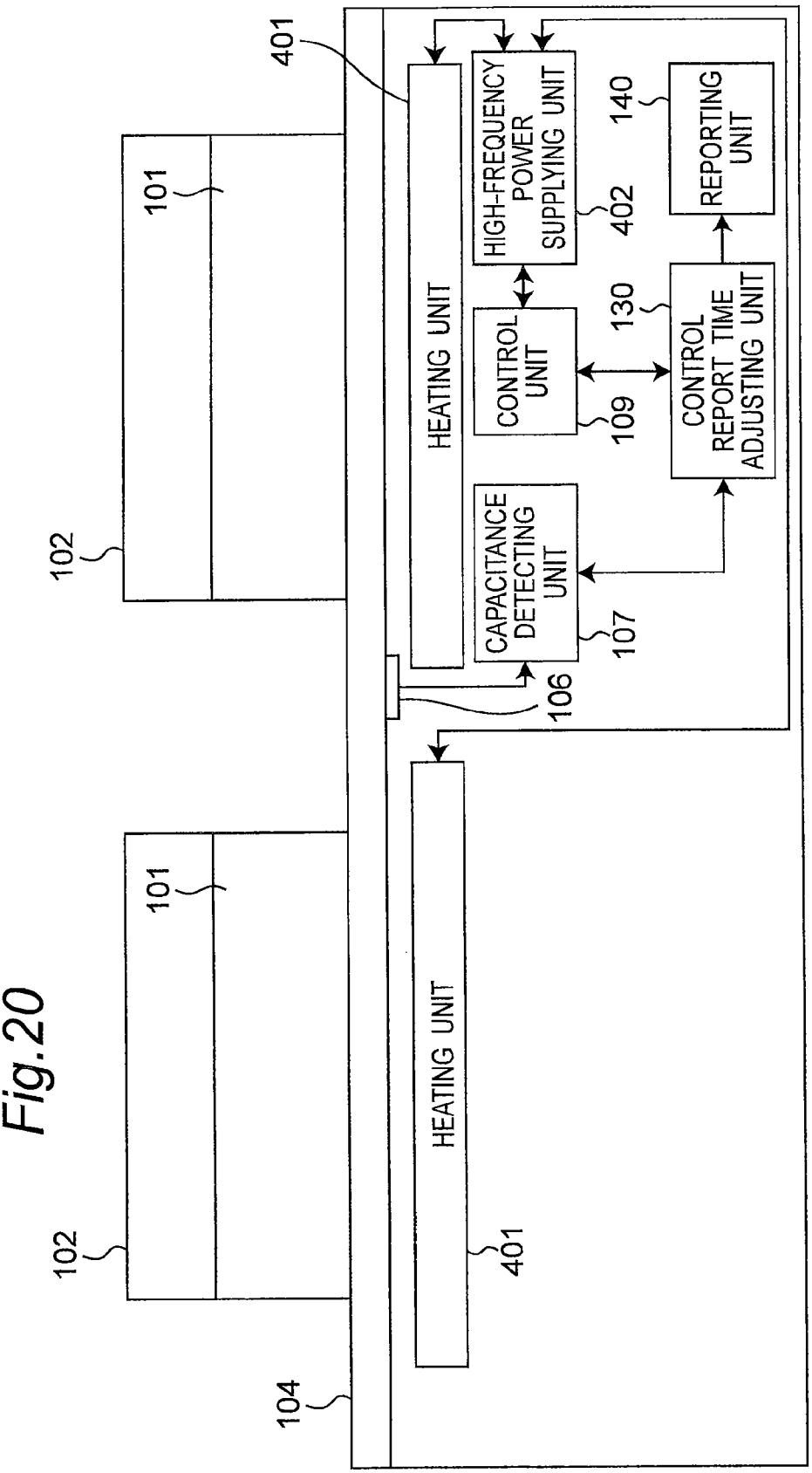
FIG. 20 is a block diagram showing still another structure of the heating/cooking equipment according to the second embodiment of the present invention.

With reference to FIG. 20, a description will be given of a case in which the heating/cooking equipment includes a plurality of heating coils 401. In this case, in a case where the electrostatic capacitance of the electrode 106 provided between a plurality of heating coils (two in FIG. 20) 401 has changed, that is, when boiling over has occurred, heating at all the heating coils 401 are stopped. Upon occurrence of boiling over, in some cases, the boiled over material to be cooked 101 may flow from one heating-target object 102 over the top plate 104 to enter the region beneath the other heating-target object 102. Here, in a case where the other heating coil 401 is also performing heating, the material to be cooked 102 entered beneath the other heating-target object 102 may possibly burn thereto. Accordingly, the control report time adjusting unit 130 stops heating of all the heating coils 401 when it senses occurrence of boiling over. As described above, by exerting the heating amount control to all the plurality of heating coils 401, such occurrence of boiling over can surely be addressed.

(Variation 4)

Figure 21:
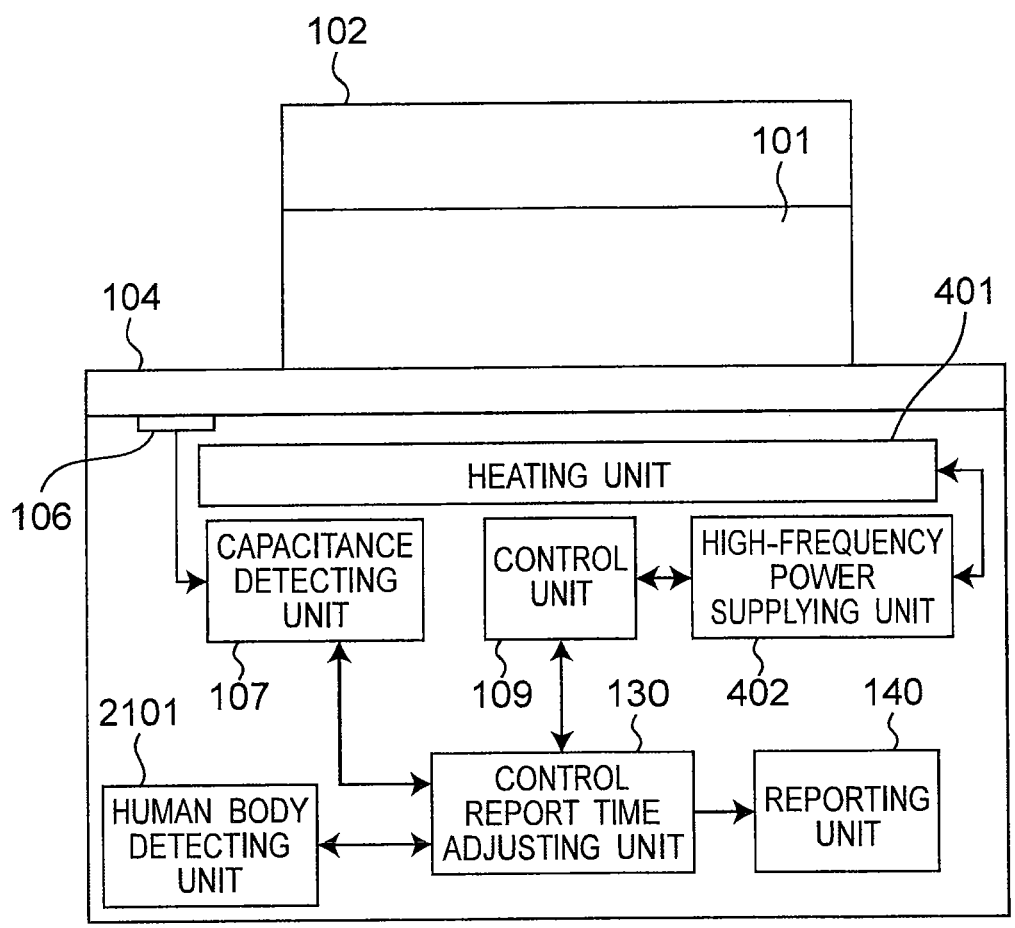
FIG. 21 is a block diagram showing still another structure of the heating/cooking equipment according to the second embodiment of the present invention.

With reference to FIG. 21, a description will be given of a case where the heating/cooking equipment includes a human body detecting unit 2101 that checks the presence of the user who cooks. For example, by using an infrared sensor as the human body detecting unit 2101, the structure of the human body detecting unit 2101 can easily be implemented. The human body detecting unit 2101 checks whether or not the user is present during heating is carried out. Depending on whether or not the user is present, the heating/cooking equipment executes different operations upon detection of boiling over.

Specifically, the human body detecting unit 2101 always detects whether the user is present in front of the heating/cooking equipment. The control report time adjusting unit 130 queries the human body detecting unit 2101 as to whether or not the user is present in front of the heating/cooking equipment when making a determination as to boiling over at steps S1503 and S1508 in FIG. 15. When it is found that the user is present in front of the heating/cooking equipment, the control report time adjusting unit 130 prohibits the boiling over determination. That is, it does not execute the process shown in FIG. 15. On the other hand, when the control report time adjusting unit 130 senses, based on the human body detecting unit 2101, that the changes are frequent in the reaction of the user and hence the user is moving around, it determines that the user is not always present in front of the heating/cooking equipment because the user may not be paying attention to the material to be cooked 101. Therefore, the control report time adjusting unit 130 executes the boiling over determination shown in FIG. 15.

As described above, when the user is present near the heating/cooking equipment, the determination can be deferred to the user. Therefore, the determination as to boiling over is not made. The boiling over determination is executed when the user is not present near the heating/cooking equipment. It is to be noted that, when the user is present near the heating/cooking equipment, the boiling over determination may not fully be executed (that is, the heating amount is not changed), and the heating amount may be reduced when an occurrence of boiling over is determined. In this manner, since the determination can be deferred to the user when the user is present near the heating/cooking equipment, heating may not necessarily be stopped. On the other hand, when the user is not present in front of the heating/cooking equipment, since heating cannot be stopped by the user, preferably heating is stopped upon occurrence of boiling over (S1509). Alternatively, the heating amount is reduced than that when boiling over is not occurring.

It is to be noted that, as a default setting item, it may previously be configured such that the user can set whether or not to prohibit the boiling over occurrence determination upon detection of human body. Thus, it becomes possible to realize the operation in accordance with the intention of the user.

(Variation 5)

Figure 22:
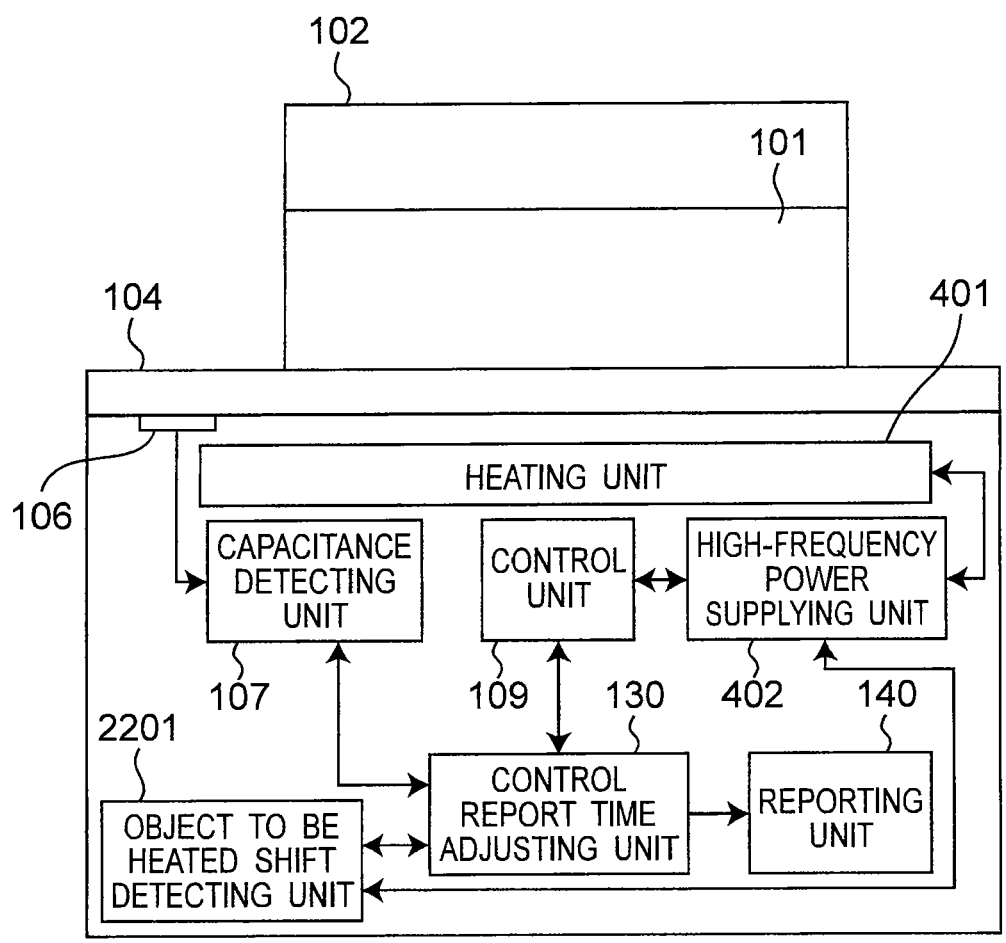
FIG. 22 is a block diagram showing still another structure of the heating/cooking equipment according to the second embodiment of the present invention.

As shown in FIG. 22, the heating/cooking equipment may further include an object to be heated shift detecting unit 2201 that detects shift of the object to be heated 102 such as a pot. This structure can easily be implemented by using a current sensor that observes a change in the current flowing through the heating coil 401 as the object to be heated shift detecting unit 2201. In this case, the heating/cooking equipment executes different operations upon detection of boiling over, depending on whether or not the object to be heated 102 is shifted.

When the state of the object to be heated 102 transits from the state where it is not placed on the electrode 106 to the state where it is placed on the electrode 106, the electrostatic capacitance of the electrode 106 changes. Depending on the material or the state of the object to be heated 102, the electrostatic capacitance changes greatly. Accordingly, the control report time adjusting unit 130 may erroneously determine that boiling over has occurred. In order to prevent the erroneous determination, the control report time adjusting unit 130 queries the object to be heated shift detecting unit 2201 as to whether or not the object to be heated 102 has shifted, before making a boiling over detection determination of steps S1503 and S1508 in FIG. 15. When the position of the object to be heated 102 on the heating coil 401 shifts because of the cooking work of the user or the like, the magnetic coupling between the heating coil 401 and the object to be heated 102 changes, and therefore, the current flowing through the heating coil 401 changes. The object to be heated shift detecting unit 2201 recognizes this change in the current, and transmits the presence or absence of the change in the current to the control report time adjusting unit 130. When the current of the heating coil 401 changes, the control report time adjusting unit 130 determines that the object to be heated 102 is shifted, and the control report time adjusting unit 130 does not make the boiling over detection determination of steps S1503 and S1508 in FIG. 15. This makes it possible to prevent an erroneous determination of the boiling over occurrence from being made when the change in the electrostatic capacitance of the electrode 106 is generated due to shift of the object to be heated 102. It is to be noted that, when a change in the position of the object to be heated 102 is sensed, that is, when the state of the object to be heated 102 transits from the state where the object to be heated 102 is not placed on the electrode 106 to a state where it is placed on the electrode 106, the control unit 109 controls the high-frequency power supplying unit 402 to recover the electric power instructed by the user.

As described above, the object to be heated shift detecting unit 2201 that detects shift of the object to be heated 102 is included, and the control report time adjusting unit 130 does not execute the boiling over determination when the object to be heated 102 is shifted. Thus, in detecting boiling over, it becomes possible to exclude an apparent disturbance such as a change in the electrostatic capacitance of the object to be heated 102 caused by shift of a pot or the like.

(Variation 6)

Figure 23:
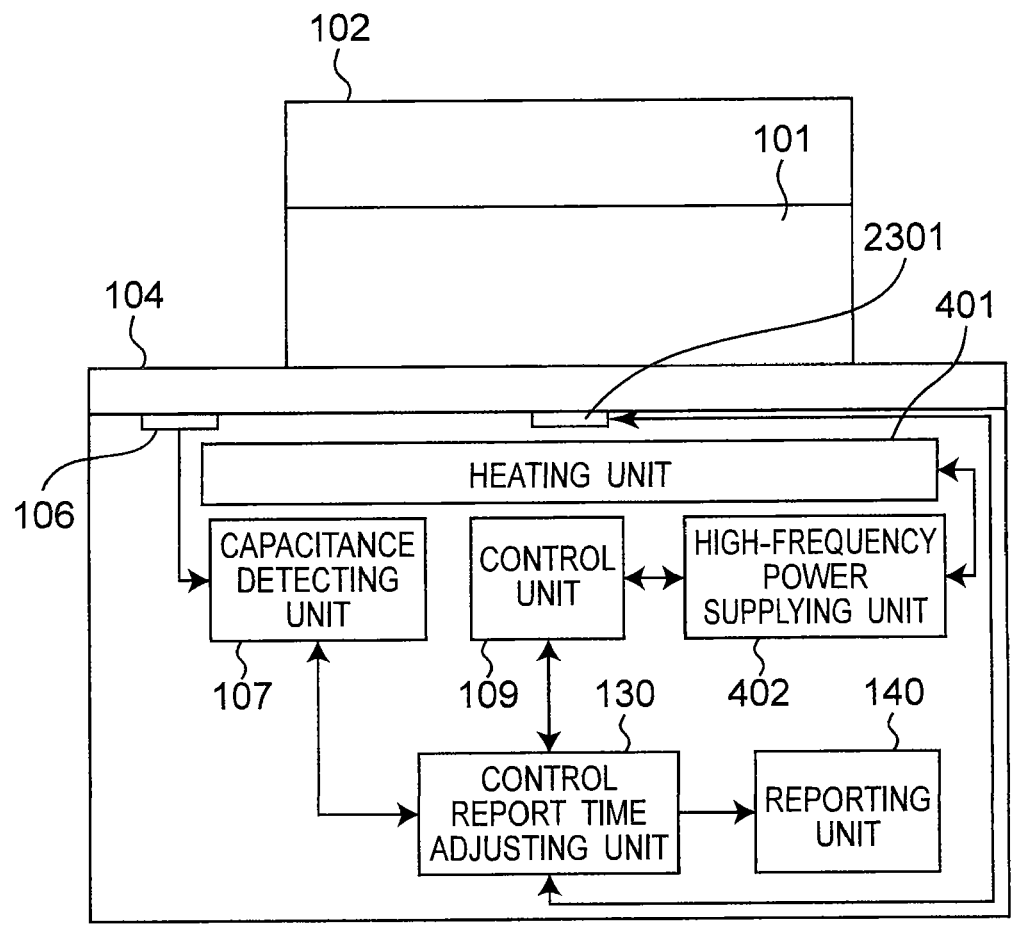
FIG. 23 is a block diagram showing still another structure of the heating/cooking equipment according to the second embodiment of the present invention.

As shown in FIG. 23, the heating/cooking equipment may further include a temperature detecting unit 2301 that detects the temperature of the object to be heated 102 such as a pot. Using a thermistor that observes a temperature change as the temperature detecting unit 2301, this structure can easily be implemented. In this case, different boiling over detection operations are executed in accordance with the temperature of the object to be heated 102 indicated by the temperature detecting unit 2301.

Boiling over is caused by growth of bubbles produced by a boiling phenomenon. Accordingly, when the temperature of the object to be heated 102 being heated by the heating coil 401 is lower than the boiling point of water, such a phenomenon that the material to be cooked 101 boils over the object to be heated 102 does not occur. That is, when the electrostatic capacitance of the electrode 106 changes in a case where the temperature of the object to be heated 102 is lower than the boiling point of water, it can be determined that the change in the electrostatic capacitance is not due to boiling over. Hence, the control report time adjusting unit 130 acquires the temperature of the object to be heated 102 from the temperature detecting unit 2301 immediately before making the boiling over detection determination of steps S1503 and S1508 in FIG. 15. In a case where the acquired temperature of the object to be heated 102 is lower than the boiling point of water, the control report time adjusting unit 130 does not execute the boiling over detection determination at steps S1503 and S1508 in FIG. 15. That is, the process upon occurrence of boiling over shown in FIG. 15 is not executed.

As described above, the temperature detecting unit 2301 that detects the temperature of the object to be heated 102 is included, and the control report time adjusting unit 130 does not execute the boiling over detection when the temperature of the object to be heated 102 is lower than the boiling point of water. Thus, it becomes possible to determine, as the disturbance, the change in the electrostatic capacitance that occurred when there is no possibility of boiling over. Hence, the process upon occurrence of boiling over will not erroneously be performed.

As described above, in the heating/cooking equipment according to each of the second embodiment and Variations, the electrode 106 is arranged under the top plate 104, and based on the electrostatic capacitance value of the electrode 106 detected by the capacitance detecting unit 107, the control report time adjusting unit 130 recognizes any state change occurring on the top plate 104. Further, the control report time adjusting unit 130 once executes the heating amount control intended to prevent the boiled over material from spreading, in a case where it is assumed that boiling over of the material to be cooked 101 has occurred, and thereafter, fixes whether the change in the electrostatic capacitance is due to boiling over. Then, the control report time adjusting unit 130 executes a report to the user or a recover to the original heating amount. Hence, it becomes possible to prevent execution of the process upon occurrence of boiling over, based on an erroneous boiling over determination, when the user shifts ingredients, eating utensils, and cooking utensils, or when the user carries out wipe-cleaning with a kitchen cloth on the top plate 104 which is used also as a countertop. This makes it possible to provide the heating/cooking equipment possessing a highly practical boiling over detecting function. It is to be noted that, the boiling over detection operation can also be applied to heating/cooking equipment which utilizes gas combustion, so long as it employs a glass top plate so as to attain a flattened surface and to allow easier wipe-cleaning, and to be usable as a countertop if flame is avoided.

The first embodiment, the second embodiment, and Variations may arbitrarily be combined.

INDUSTRIAL APPLICABILITY

The heating/cooking equipment of the present invention exhibits the advantage of realizing the highly practical boiling over detecting function, and is useful for a variety of heating/cooking equipment, such as induction heating/cooking equipment or gas cooking equipment.

REFERENCE SIGNS LIST 101 material to be cooked
102 heating-target object
103 reference potential
104 top plate
105 heating unit
106 electrode
107 capacitance detecting unit
108 boiling over detecting unit
109 control unit
130 control report time adjusting unit
140 reporting unit
401 heating coil
402 high-frequency power supplying unit
601 filter
701 boiled over material contacting state detecting unit
1001 boiled over material contacting state confirming unit
1701 threshold value determining unit
2101 human body detecting unit
2201 object to be heated shift detecting unit
2301 temperature detecting unit

The invention claimed is:
1. A heating/cooking equipment, comprising:
a top plate;
a heating unit configured to heat an object to be heated placed on the top plate;
at least one electrode arranged under the top plate;
a capacitance detecting unit configured to detect an electrostatic capacitance of the electrode; and
a microcomputer configured to detect boiling over of material cooked in the object based on a value of the electrostatic capacitance of the electrode received from the capacitance detecting unit, and to control a heating operation of the heating unit based on a detection result of boiling over, wherein
the top plate is directly connected to a circuit potential, a ground potential, or a potential above the ground potential, and
the capacitance detecting unit detects a change in the electrostatic capacitance of the electrode by exploiting capacitive coupling between the electrode and the circuit potential, the ground potential, or the potential above the ground potential to which the top plate is connected.
2. The heating/cooking equipment according to claim 1, further comprising:
a metal member provided under the top plate and near the electrode.

3. The heating/cooking equipment according to claim 1, wherein
the heating unit includes:
a heating coil configured to inductively heat the object to be heated as being supplied with high-frequency power; and
a high-frequency power supplying unit configured to supply the high-frequency power to the heating coil.
4. The heating/cooking equipment according to claim 3, wherein
the heating coil comprises a metal member, which comprises a copper winding wire used for the heating coil.
5. The heating/cooking equipment according to claim 4, wherein
a shape of the electrode is an arc-shape that is positioned substantially concentrically on the heating coil.
6. The heating/cooking equipment according to claim 3, further comprising:
a filter configured to remove an induction heating frequency component superimposed on the change of the electrostatic capacitance of the electrode detected by the capacitance detecting unit.
7. The heating/cooking equipment according to claim 3, wherein
the microcontroller makes a determination as to boiling over, by observing an induction heating frequency component generated due to an effect of induction heating by capacitive coupling between the electrode and the heating coil.
8. The heating/cooking equipment according to claim 1, wherein the electrode is printed on the top plate.
9. The heating/cooking equipment according to claim 1, wherein
the capacitance detecting unit observes a change in an impedance due to an increase in the electrostatic capacitance of the electrode by using a voltage dividing circuit.
10. The heating/cooking equipment according to claim 3, further comprising:
a boiled over material contacting state detecting unit configured to sense an increase in the electrostatic capacitance of the electrode due to capacitive coupling between the electrode and the object to be heated via a boiled over material physically in contact with the object to be heated, to recognize an electric field change of induction heating-origin directly transferred from the object to be heated, wherein
the microcontroller detects the boiled over material, based on a detection result of the capacitance detecting unit and a detection result of the boiled over material contacting state detecting unit.
11. The heating/cooking equipment according to claim 10, further comprising:
a boiled over material contacting state confirming unit configured to execute, through the microcontroller, heating control for confirming whether the increase in the electrostatic capacitance of the electrode sensed by the boiled over material contacting state detecting unit is due to the capacitive coupling between the electrode and the object to be heated via the boiled over material.
12. The heating/cooking equipment according to claim 11, wherein
the heating control is, upon sensing the increase in the electrostatic capacitance of the electrode by the boiled over material contacting state detecting unit, to stop a heating operation performed by the heating coil for a prescribed time, and after a lapse of the prescribed time, to operate the heating coil with smaller heating power as compared to heating power before the stop of the heating operation.

13. The heating/cooking equipment according to claim 3, further comprising:
    a reporting unit configured to report an occurrence of boiling over to a user, wherein
    microcontroller is a control report time adjusting unit configured to execute, upon a determination of the occurrence of boiling over, a boiling over detecting process that includes an operation of controlling a heating amount of the heating coil through the microcontroller and an operation of adjusting a time until the reporting unit reports the occurrence of boiling over to the user.

14. The heating/cooking equipment according to claim 13, wherein
    the control report time adjusting unit is configured to compare a detection value of the capacitance detecting unit with a prescribed threshold value, to detect the boiled over material,
    the heating/cooking equipment further comprising:
        a threshold value determining unit configured to determine the prescribed threshold value based on a value of the electrostatic capacitance of the electrode at a start of heating.

15. The heating/cooking equipment according to claim 13, wherein
    a plurality of the electrodes are included, and
    the control report time adjusting unit executes the boiling over detecting process based on a value of the electrostatic capacitance of each of a plurality of the electrodes.

16. The heating/cooking equipment according to claim 15, wherein
    when the electrostatic capacitance of each of a plurality of the electrodes changes at a start of heating, the control report time adjusting unit simultaneously controls the heating unit to stop heating and controls the reporting unit to make a report.

17. The heating/cooking equipment according to claim 15, wherein
    when the electrostatic capacitance of at least one of a plurality of the electrodes changes at a start of heating, the control report time adjusting unit simultaneously controls the heating unit to stop heating and controls the reporting unit to make a report.

18. The heating/cooking equipment according to claim 13, wherein
    the heating coil includes a plurality of the heating coils, and
    the control report time adjusting unit controls the heating amount of all of the heating coils when the boiled over material is detected.

19. The heating/cooking equipment according to claim 13, further comprising:
    a human body detecting unit configured to detect whether or not a person is present, wherein
    the control report time adjusting unit executes the boiling over detecting process based on a detection result of the human body detecting unit.

20. The heating/cooking equipment according to claim 13, further comprising:
    an object to be heated shift detecting unit configured to detect whether or not the object to be heated is shifted, wherein
    the control report time adjusting unit prohibits execution of the boiling over detecting process, when the object to be heated shift detecting unit detects shift of the object to be heated.

21. The heating/cooking equipment according to claim 13, further comprising:
    a temperature detecting unit configured to detect a temperature of the object to be heated, wherein
    the control report time adjusting unit prohibits execution of the boiling over detecting process, when the temperature of the object to be heated detected by the temperature detecting unit is lower than a boiling point of water.

* * * * *

UNITED STATES PATENT AND TRADEMARK OFFICE
CERTIFICATE OF CORRECTION

| | | |
|---|---|---|
| PATENT NO. | : 9,078,295 B2 | Page 1 of 1 |
| APPLICATION NO. | : 13/145686 | |
| DATED | : July 7, 2015 | |
| INVENTOR(S) | : Masafumi Sadahira et al. | |

It is certified that error appears in the above-identified patent and that said Letters Patent is hereby corrected as shown below:

<u>On the Title Page</u>

Item (73) Assignee, delete "Panasonic Corporation" and insert -- Panasonic Intellectual Property Management Co., Ltd. --

Signed and Sealed this
Eighth Day of March, 2016

Michelle K. Lee
*Director of the United States Patent and Trademark Office*